US007085777B2

(12) United States Patent
Beck et al.

(10) Patent No.: US 7,085,777 B2
(45) Date of Patent: Aug. 1, 2006

(54) METHOD AND SYSTEM FOR TRACING THE IDENTITY OF AN AGRICULTURAL PRODUCT

(75) Inventors: Andy Dwayne Beck, Urbandale, IA (US); Terence Daniel Pickett, Waukee, IA (US); Frederick William Nelson, Waukee, IA (US); Thomas Kent Wagner, Ankeny, IA (US)

(73) Assignee: Deere & Company, Moline, IL (US)

( * ) Notice: Subject to any disclaimer, the term of this patent is extended or adjusted under 35 U.S.C. 154(b) by 560 days.

(21) Appl. No.: 10/393,092

(22) Filed: Mar. 20, 2003

(65) Prior Publication Data
US 2004/0015477 A1    Jan. 22, 2004

Related U.S. Application Data

(63) Continuation-in-part of application No. 10/327,277, filed on Dec. 20, 2002, now Pat. No. 6,671,698.

(60) Provisional application No. 60/366,181, filed on Mar. 20, 2002.

(51) Int. Cl.
*G06F 17/30* (2006.01)
(52) U.S. Cl. .......................... 707/104.1; 707/7; 705/37
(58) Field of Classification Search ............. 707/1–10, 707/100–104.1, 200–205; 705/37
See application file for complete search history.

(56) References Cited

U.S. PATENT DOCUMENTS

| 5,478,990 | A | 12/1995 | Montanari et al. .......... 235/375 |
|---|---|---|---|
| 5,845,229 | A | 12/1998 | Rawlins .......................... 702/2 |
| 6,119,531 | A | 9/2000 | Wendte et al. ............. 73/863.52 |
| 6,211,789 | B1 | 4/2001 | Oldham et al. ............ 340/573.3 |
| 6,231,435 | B1 | 5/2001 | Pilger .......................... 452/157 |
| 6,327,569 | B1 | 12/2001 | Reep .............................. 705/1 |
| 6,329,920 | B1 | 12/2001 | Morrison et al. ......... 340/573.3 |
| 6,342,839 | B1 | 1/2002 | Curkendall et al. ...... 340/573.3 |
| 6,346,885 | B1 | 2/2002 | Curkendall et al. ...... 340/572.4 |
| 6,385,544 | B1 | 5/2002 | Mafra-Neto .................... 702/5 |
| 2001/0011437 | A1 | 8/2001 | Shortridge et al. .......... 47/58.1 |
| 2001/0029996 | A1 | 10/2001 | Robinson ..................... 141/11 |
| 2002/0012934 | A1 | 1/2002 | Meghan et al. ................ 435/6 |
| 2002/0032497 | A1 | 3/2002 | Jorgenson et al. .......... 700/115 |
| 2002/0082982 | A1 | 6/2002 | Mock et al. ................... 705/37 |
| 2002/0091593 | A1 | 7/2002 | Fowler ......................... 705/28 |
| 2002/0095232 | A1 | 7/2002 | Jorgenson et al. ............ 700/99 |
| 2003/0033224 | A1 | 2/2003 | Ludwig et al. ............... 705/28 |

(Continued)

FOREIGN PATENT DOCUMENTS

FR        2 776 790 A1    10/1999

(Continued)

OTHER PUBLICATIONS

Heidi Reichert and Kimberly Vachal, *Identity Preserved Grain, Logistical Overview* (Jan. 2000).

*Primary Examiner*—Mohammad Ali

(57) ABSTRACT

A method and system for tracing the identity of an agricultural product comprises holding an agricultural product in a container having a tag. A container identifier of the tag is determined by reading the tag. Ancillary data is generated and is associated with a container location and the reading time. The ancillary data may include a status indicator (e.g., transaction descriptor) for the product, a custodian identifier or both. The container identifier and the ancillary data is transmitted for storage in a data storage system. A product-flow description (e.g., chain of custody) is established for the agricultural product for transport of the product from the origination location to the destination location.

21 Claims, 12 Drawing Sheets

U.S. PATENT DOCUMENTS

2004/0024782 A1    2/2004    Chamberlain ............ 707/104.1

FOREIGN PATENT DOCUMENTS

| | | |
|---|---|---|
| FR | 2 813 683 A1 | 3/2002 |
| FR | 2 836 257 | 8/2003 |
| WO | WO 00/48454 | 8/2000 |
| WO | WO 01/93036 A1 | 12/2001 |
| WO | WO 02/13594 A1 | 2/2002 |
| WO | WO 02/37375 A1 | 5/2002 |
| WO | WO 03/058404 A2 | 7/2003 |

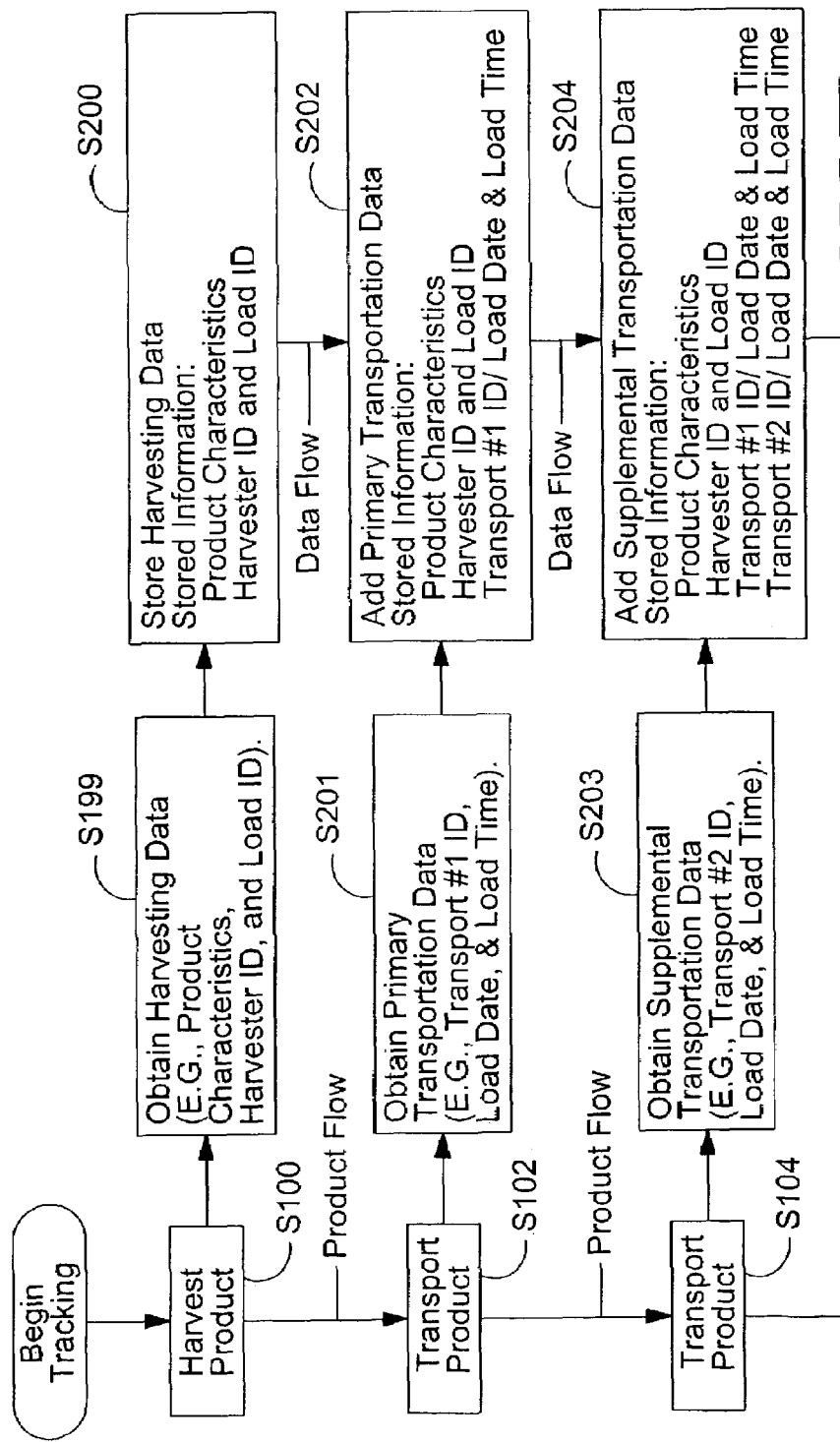

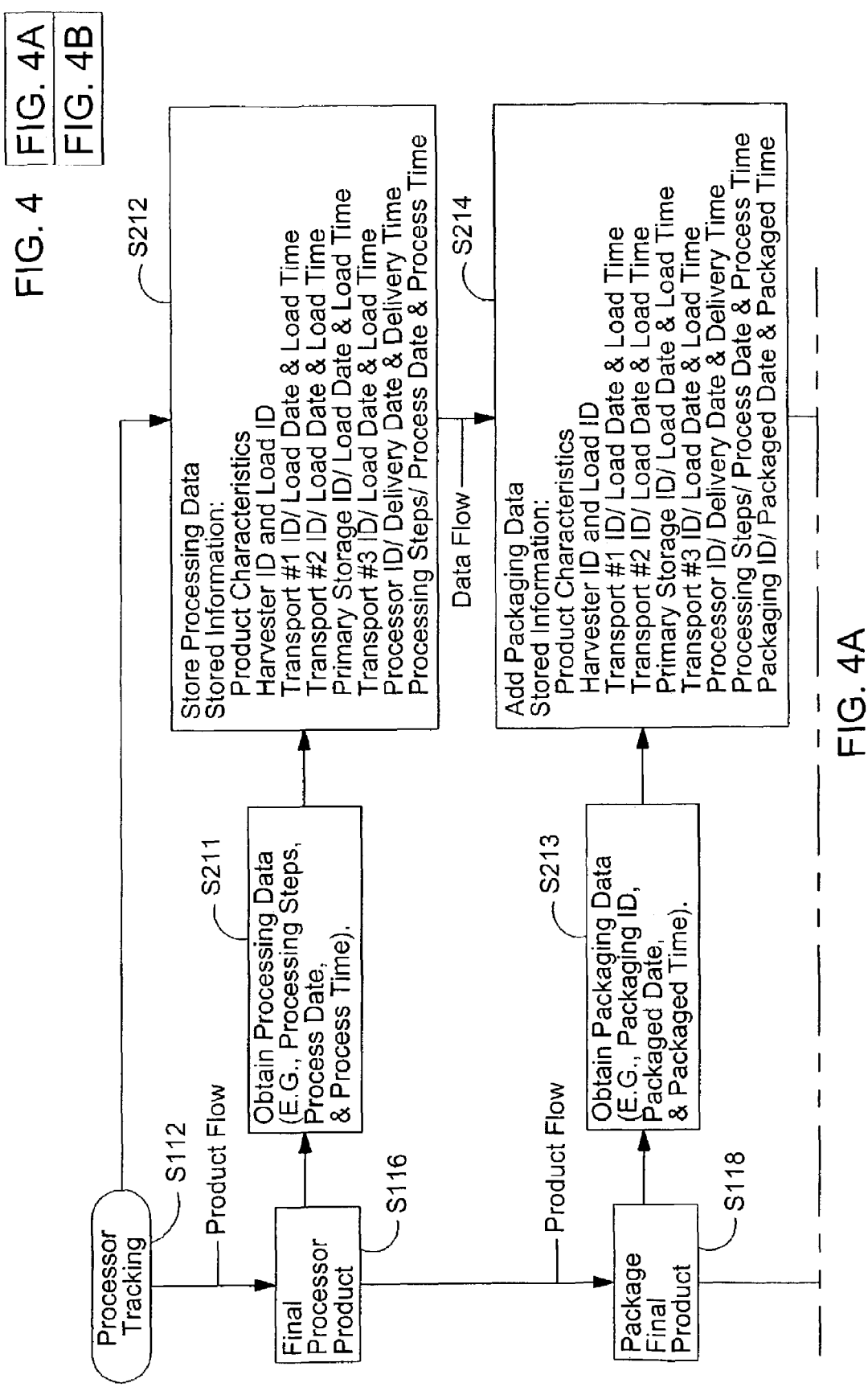

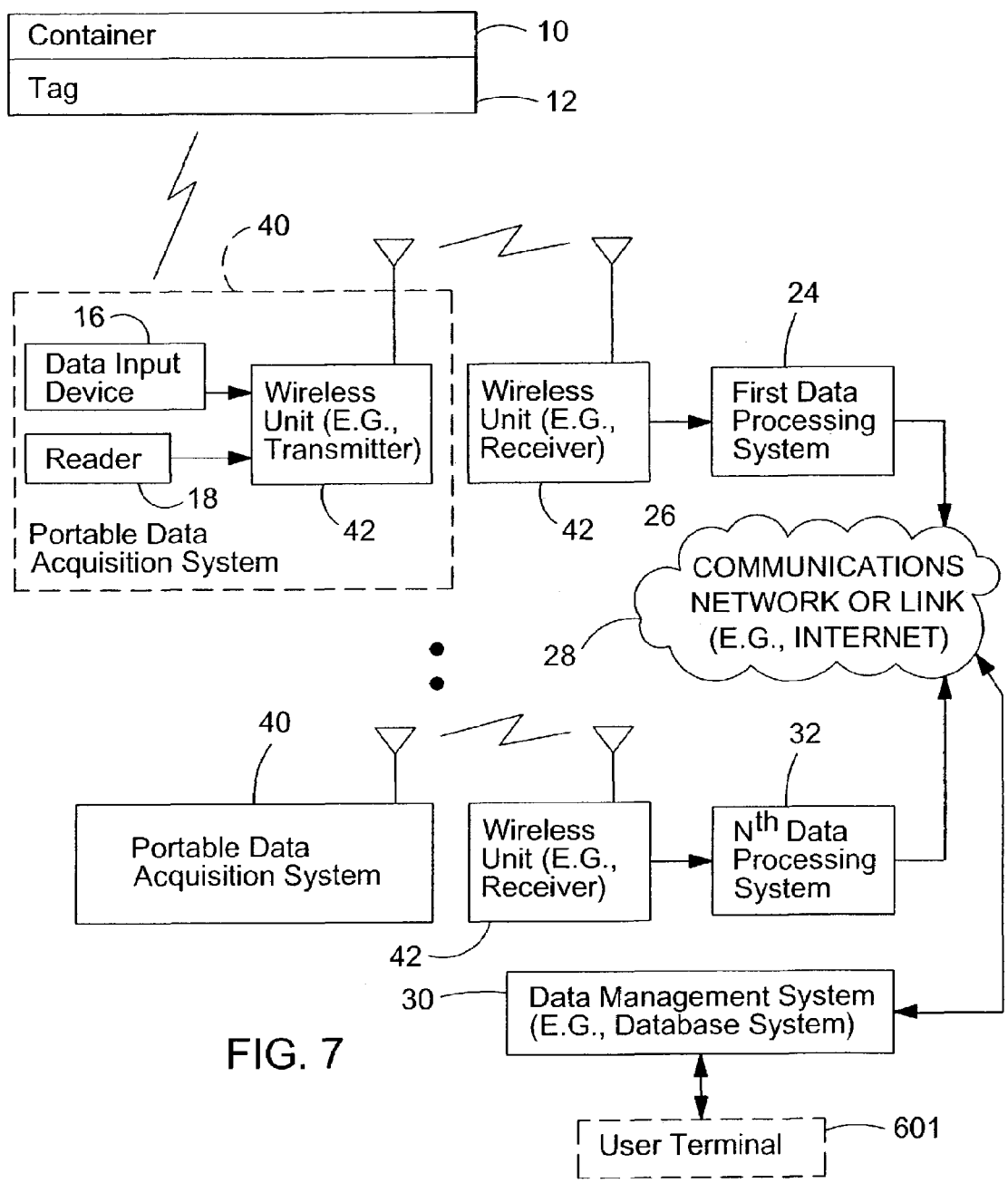
FIG. 7
ASSOCIATE THE AGRICULTURAL PRODUCT WITH HARVESTING DATA (E.G., PRODUCT CHARACTERISTIC DATA, HARVEST IDENTIFIER, OR BOTH).
S20
FIG. 8
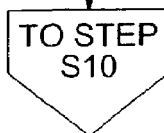
TO STEP S10

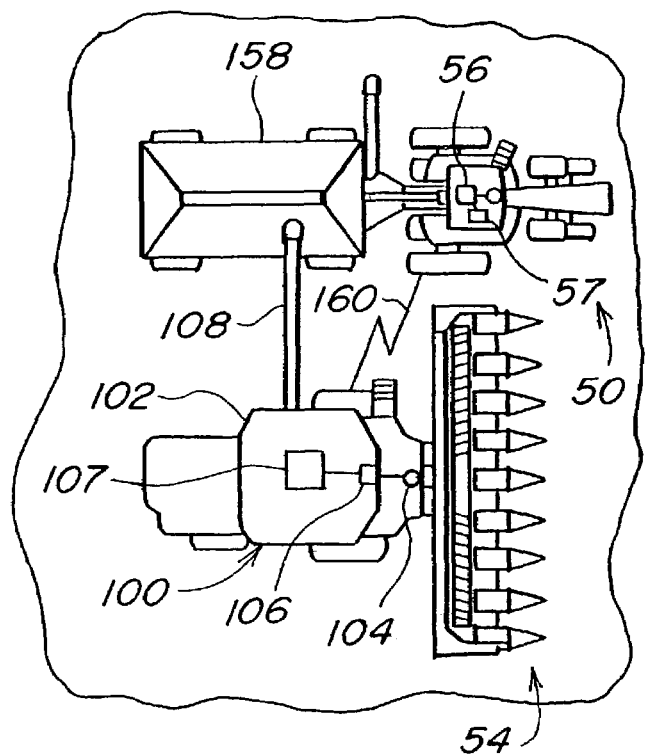
FIG. 11
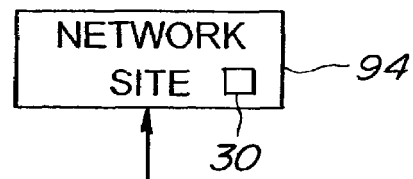
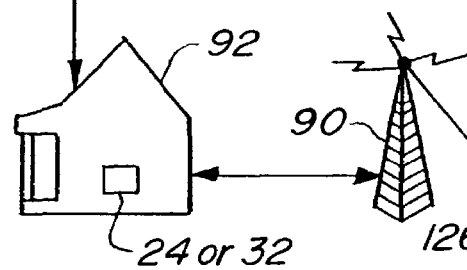
FIG. 12
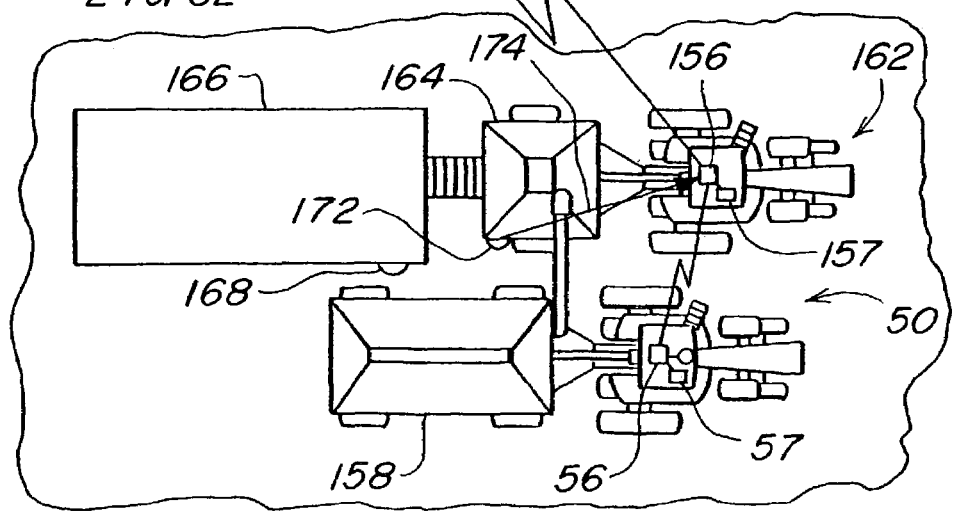

METHOD AND SYSTEM FOR TRACING THE IDENTITY OF AN AGRICULTURAL PRODUCT

This application is a continuation-in-part application of U.S. patent application Ser. No. 10/327,277, filed on Dec. 20, 2002 now U.S. Pat. No. 6,671,698, which claims the benefit of U.S. Provisional Application No. 60/366,181, filed Mar. 20, 2002; and this application is entitled to the benefit of the foregoing prior applications under 35 U.S.C. 119(e) and 35 U.S.C. 120.

FIELD OF THE INVENTION

The invention relates to a method and system for tracing the identity of an agricultural product.

BACKGROUND OF THE INVENTION

Agricultural products may include horticultural crops and livestock. Livestock includes animals that are raised for food and for other products. Horticultural crops may be classified as edible crops, inedible crops, pharmaceutical crops, genetically engineered crops, genetically modified organisms (GMOs), non-GMOs, organic, pesticide-free or in accordance with other crop attributes. Inedible crops may include crops, such as fiber, cotton or rubber, for example. Genetically modified crops may include vegetables that are genetically manipulated to hold their shelf life longer than traditionally cultivated vegetables. Pharmaceutical crops may include plants or crops that are genetically engineered to produce or contain novel proteins, monoclonal antibodies, other compounds or precursors thereto with biologically active or pharmacological properties for the treatment of disease in humans and/or animals. Organic crops are harvested from plants that are grown without exposure to certain pesticides, herbicides or other chemicals.

Crops may be grown to specific crop attributes or specifications. Crop attributes may be based on the genetic composition of a crop, the growing practices for a crop, or both. For example, a certain variety of corn may be grown that has a greater oil content than other varieties because of genetic or environmental factors. Similarly, a certain variety of soybeans may be grown that has a different protein content or other crop attribute that is desirable. A processor, a pharmaceutical company, a manufacturer or another business concern may desire to purchase agricultural products with specific crop attributes from a grower or another supplier. The grower or supplier wishes to charge a premium for crops with specific crop attributes compared to a commodity-type crop. The purchaser of the agricultural product desires sufficient assurance that the agricultural product that is being purchased actually possesses the crop attributes that are sought.

However, in the U.S., some prevalent crop production and distribution practices are not generally amenable to providing sufficient assurance to the purchaser of crops with specific crop attributes. Presently, many of the different varieties of horticultural crops are stored in large storage bins at grain elevators and different varieties are often mixed together, purposely or unintentionally, at grain elevators or in other storage systems. The various classifications of grains, vegetables and fruits are often based on general U.S. Department of Agriculture (USDA) guidelines that rate the crops based on appearance and quality, as opposed to specific crop attributes (e.g., genetically modified attributes). Therefore, the mixing of different varieties of crops, or crops from different growers, has been a widely accepted practice in the U.S. that predates the advent of various novel genetically engineered attributes of crops.

Traditionally, many horticultural crops have been regarded as commodities in which one crop or plant has been regarded the same or equivalent as any other of the same general type. However, because of technological advances, crops may be differentiated by growing practices, genetic attributes, and other specifications. A particular agricultural product with a first attribute must be segregated to preserve its identity or to prevent contamination from another agricultural product with a second attribute, where the first and second attributes are incompatible or inconsistent with the contractual terms of a grower contract or sale of the agricultural product. Thus, a need exists to accurately identity crops with specific crop attributes throughout the growing, distribution, and production of crops and any products derived therefrom. Further, a purchaser of an agricultural product or a crop may desire or demand the ability to trace the identity of the crop with specific crop attributes to verify the presence of the crop attributes as a condition for a commercial transaction.

SUMMARY OF THE INVENTION

In accordance with the invention, a method and system for tracing the identity of an agricultural product comprises holding an agricultural product in a container. The container is associated with a tag (e.g., an optically-readable tag, a radio frequency tag or an electronically-readable tag). The tag is read at a reading time when the container may be located at an original location, a destination location or an intermediate location between the origination location and the destination location.

A container identifier of the tag is determined by reading the tag associated with the container. Ancillary data is generated and is associated with one of the locations and a corresponding reading time. The ancillary data may include a status indicator (e.g., transaction descriptor) for the product, a custodian identifier or both. The container identifier and the ancillary data is transmitted for storage in a data storage system. A chain of custody, a historical travel path or another product-flow description is established for the agricultural product for transport or any other handling or processing of the product from the origination location to the destination location.

BRIEF DESCRIPTION OF THE DRAWINGS

FIG. 7 is yet another alternate embodiment for tracing the identity of an agricultural product.

FIG. 8 is a flow chart of a procedure for collecting data on product characteristics.

FIG. 11 is a plan view of a harvesting operation with a combine unloading into a grain cart.

FIG. 12 is a schematic illustration of a harvesting operation with a container being loaded from a grain cart.

DESCRIPTION OF THE PREFERRED EMBODIMENT

Figure 1:
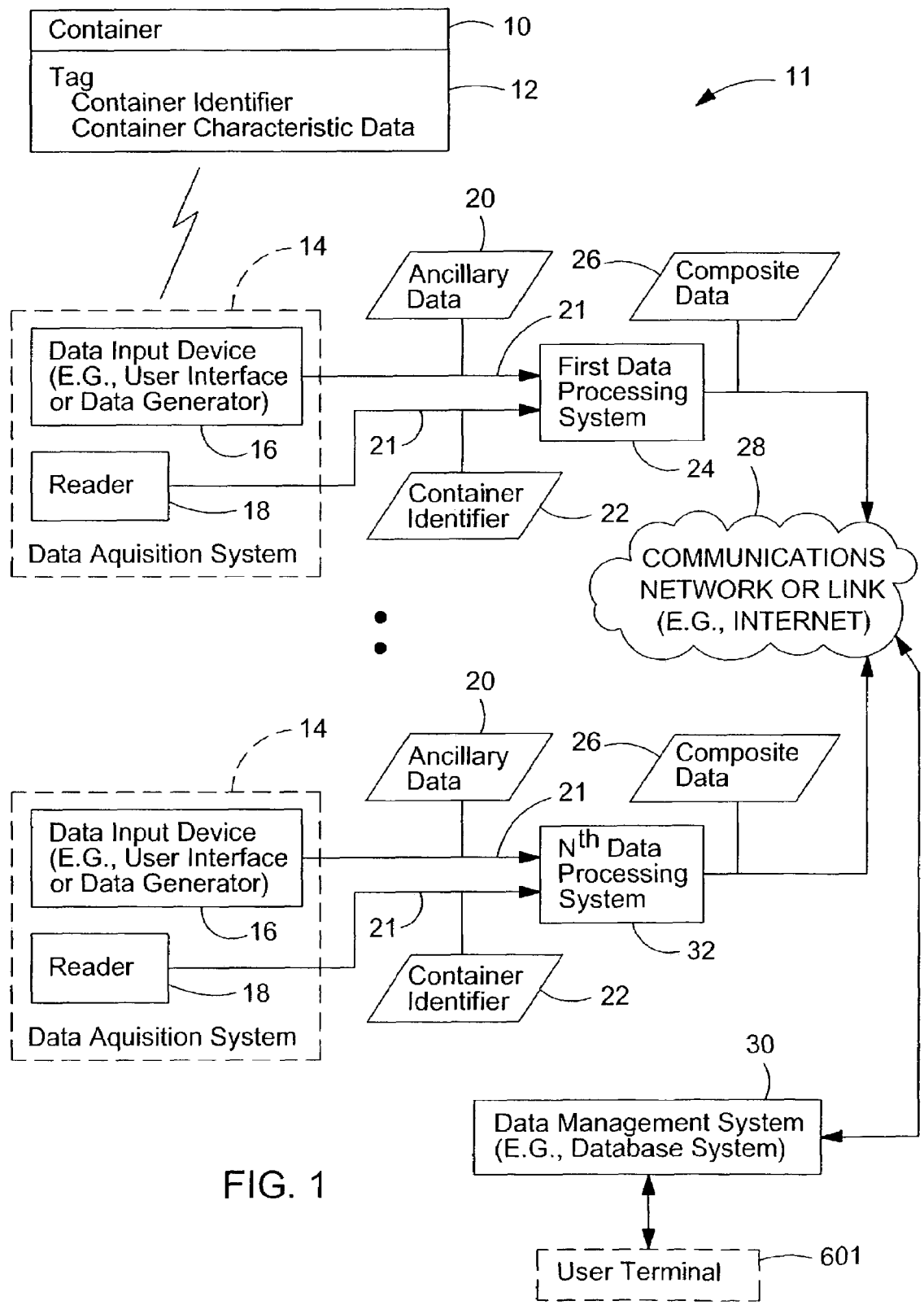
FIG. 1 is a block diagram of one embodiment of a system for tracing the identity of an agricultural product in accordance with the invention.

An agricultural product includes, but is not limited to, a crop, a derivative of a crop, an extract from a crop, an intermediate product, and a final product. A crop may include, but is not limited to, any of the following: an organic crop, an organically grown vegetable, an organically grown fruit, number two yellow corn, high oil corn, high starch corn, waxy corn, highly fermentable corn, white corn, nutritionally enhanced corn, pest-resistant corn, corn resistant to corn earworms, herbicide resistant corn, non-genetically modified corn, and genetically modified corn, corn with genetically altered protein content, corn with genetically altered enzyme content, high protein soybeans, high oil soybeans, large soybeans, non-genetically modified soybeans, and genetically modified soybeans, and any other crop attributes.

A product-flow description may comprise one or more of the following: chain of custody of an agricultural product or a derivative thereof, a list of successive custodians of an agricultural product or a derivative thereof, a historical travel path of the agricultural product or a derivative thereof, a list of successive locations of the agricultural product between an origination location and a destination location, and a product flow map. The product flow map may be represented in textual, graphical, tabular or another format. In one example, the product-flow description is based on at least one container identifier and corresponding ancillary data for sequential reading times associated with a particular agricultural product or a derivative thereof. Accordingly, the purchaser of an agricultural product or another party may verify the chain of custody; and hence, the genuine identity of the agricultural product associated with the container.

Crop information or product characteristics includes, but is not limited to, genetic data and production information on a crop or an agricultural product. Production information may include any of the following: pre-planting information, planting information, growing information, adjacent-field information, adjacent crop information, harvesting information, chemical application information, weather information, and location data.

The location data may be associated with other corresponding production information to provide location data versus planting information, location data versus growing information, location data versus chemical application information, location data versus adjacent field information, location data versus adjacent crop information, and location data versus weather information. The location data and other corresponding production information may be stored in data storage or computer memory in the form of a look-up table, a relational database or otherwise.

The pre-planting information relates to any of the following: historical planting information, historical growing information, historical harvesting information, and historical chemical application information. Further, the pre-planting information may, but need not relate to, the genetic data on the seeds or plant life. The planting information includes information such as the seed variety, the seed source, the location where the seed is planted, the date planted, soil condition, soil factor values, settings of the planting machinery and any chemicals applied at the time of planting, and other agronomic factors. The seed variety information can be obtained from the seed supplier, supplier invoice, receipt, documentation, seed contract, the seed bag or another container in which the seed is delivered.

The growing information may be collected during the growing of the crop. The growing information may include one or more of the following: chemical data, fertilizer data, nutrient data, pesticide data, herbicide data, fungicide data, irrigation data, water data, temperature data, sunlight data, growing degree day data; rate of application of at least one of a chemical, fertilizer, nutrient, pesticide, herbicide, fungicide, water or another crop input; and rate of application versus location of application of a least one of a chemical, fertilizer, nutrient, pesticide, herbicide, fungicide, water or another crop input. The weather information may include daily temperature, daily precipitation, weekly temperature, weekly precipitation, or temperature or precipitation for other time periods, for example.

Harvesting information includes information, such as the harvesting date, the harvesting location, yield of the harvested particular crop, moisture content of the harvested particular crop, the physical condition of the harvested particular crop, various settings of the harvesting machinery or machine, a measure of a particular trait or characteristic of the crop, and an storage identifier of one or more storage volumes into which the harvested particular crop is or was loaded. If a data profile contains different classifications (e.g., planting information, growing information, and harvesting information, chemical application information, and weather information) of crop data or a combination of production information, processing information, and manufacturing information, the data profile may be referred to as a collective data profile or a data profile.

Chemical information may include an identity of a chemical, identity of a compound, identity of a formulation or treatment, fertilizer data, insecticide data, herbicide data, a rate of application of the chemical, a concentration of the chemical, a manufacturer of the chemical, the solubility of the chemical, a measure of acidity or alkalinity of the chemical or other chemical-related information. One or more chemicals or compounds may be applied before, after or during the planting of a particular crop or a precursor (e.g., seed) to the particular crop.

A data profile may represent a description or definition of a particular crop, a derivative product derived from the particular crop or a final product derived from the particular crop. The data profile may have a temporal component (e.g., growing season or time span associated with the particular crop), a geographic component (e.g., a planting location and harvesting location of the particular crop), and a descriptive component (e.g., a characteristic of the particular crop).

As used herein, a storage volume or segregated storage means may comprise any of the following: a container, an inter-modal freight container, a segregated storage bin, a segregated storage bin of a grain elevator, and any other fixed or mobile container for holding a crop or agricultural product.

In one embodiment, the crop tracing method and system of the present invention traces the agricultural product or derivative thereof during and after agricultural production. The agricultural production may include any of the following agricultural activities and associated production information: the planting of seed, vegetation, or plant-life, the harvesting of the mature crop, chemical application before or after planting, weather information during the growing season, mechanical soil treatment, and other agronomic inputs. Initial data may include, but need not include, any agricultural production information associated with the agricultural product that is provided by or on behalf of the producer or grower. That is, initial data may incorporate one or more of the following agricultural production information: pre-planting information, planting information, growing information, adjacent-field information, adjacent crop information, harvesting information, chemical application information, weather information and location data.

After agricultural production, the agricultural product may be transported, stored, treated, delivered, processed or otherwise handled by one or more members of a supply chain between a producer of the agricultural product or a derivative thereof, and a consumer, user or potential recipient of the agricultural product or a derivative thereof. Additional data or ancillary data includes any data that may supplement or be added to the initial data associated with the agricultural product or any derivative thereof. The additional data or ancillary data may relate to handling of the agricultural product or any derivative product to establish a product flow description for a person, business entity, user or potential recipient of the agricultural product or derivative product. The combination of initial data and additional data is designated composite data or a data profile. In one embodiment, the composite data is associated with a storage identifier of each storage volume (e.g., container) into which the crop is placed.

The composite data and the associated storage identifier (e.g., container identifier) are maintained in a data storage device or in a database. For example, the database can be maintained by a producer at the farm office, by an information service provider or by both the producer and the information service provider. An information service provider (or holder of data profiles) operates a data service (e.g., a web site) accessible via a communications network (e.g., the Internet) or otherwise to enable information to be easily transferred to the information service provider and accessed by others (e.g., downstream supply-chain members or consumers). The producer (i.e., grower) can use at least one of the initial data, the additional data, ancillary data, and the composite data to market or sell the crop and can also deliver any of the initial data, the ancillary data, additional data, and the composite data to a purchaser of the crop or to a downstream users of the crop so the users can obtain an agricultural product with verification and/or a high degree of confidence that a desired differentiated attribute is present.

In accordance with FIG. 1, the system for tracing the identity of an agricultural product comprises data acquisition systems 14 coupled to one or more respective data processing systems (24, 32). A first data processing system 24 and an nth data processing system 32 are shown, where n represents any positive integer greater than or equal to two.

In turn, one or more data processing systems (24, 32) may be coupled to a communications network 28. The communications network 28 may support communications between the first data processing system 24 and a data management system 30 (e.g., database management system). Similarly, the communications network 28 may support communications between the nth data processing system 32 and the data management system 30. Any of the data processing systems (24, 32) may be associated with a grower of an agricultural product, a processor of an agricultural product, a manufacturer of an agricultural product, a seller of an agricultural product, a buyer of an agricultural product, a shipper of an agricultural product, a transporter of an agricultural product, a distributor of an agricultural product or another party. One or more of the data acquisition systems 14 or the data processing systems may be integrated into equipment or machines including one or more of the following: a grain cart, tractor, truck, semi-truck, a bin, a product loading mechanism or the like.

In one embodiment, the data acquisition system 14 comprises a reader 18 and a data input device 16. The data input device 16 may represent a data generator, a user interface or both. The line 21 interconnecting the data input device 16 to the first data processing system 24 represents a logical data path, a physical data path or both. Similarly, the line 21 interconnecting the reader 18 to the first data processing system 24 represents a logical data path, a physical data path or both. The lines 21 may indicate a single physical data path that is shared between the data input device 16 and the reader 18, for example.

In one embodiment, the user interface refers to a keypad, a keyboard, or a graphical user interface. The data generator may generate ancillary data 20 based on preset rules (e.g., a user profile) or program instructions. For example, when a user reads a tag, a respective selected set of ancillary data 20 is generated based on a user profile.

The system 11 for tracing the identity of an agricultural product works in conjunction with a container 10 and a tag 12. The tag 12 may be configured in accordance with various alternate configurations. In accordance with the first configuration, the tag 12 comprises a radio frequency tag (e.g., a commercially available radio frequency tag 12). An illustrative radio frequency tag is available from Amtech or Transcore as model number AT5510. In accordance with a second configuration of the invention, the tag 12 comprises an optically readable code, such as a bar code label or a universal product code (UPC) label. The optically readable code may be printed or otherwise placed on a sticker or label. In accordance with a third configuration of the invention, the tag 12 may comprise an electronic tag 12 that is activated upon receipt of a particular of electromagnetic signal or a particular modulation (e.g., a transmitted code) of the electromagnetic signal.

The reader 18 is adapted to read the tag 12 and is compatible with any of the above configurations or the requisite technology for reading the tag 12. An illustrative reader is available from Amtech or Transcore as an Al1611 SmartPass reader. SmartPass is a trademark of TC IP, Ltd. The tag 12 may contain specific information about the container 10 which may be referred to as container data. The container data may comprise one or more of the following: the volume of the container 10, container dimensions, container width, container height, container depth, container weight, container tare weight, container volumetric capacity, container refrigeration data, container environmental or climate-control data, and a container identifier 22. The reader 18 is capable of reading the tag 12 to determine the container data (e.g., container identifier 22) stored in the tag 12 or otherwise associated with the tag 12.

The data input device 16 supports the acquisition of data in accordance with several alternate techniques. Under a first technique, the data input device 16 may comprise user interface that provides ancillary data 20 for input into a data processing system (e.g., the first data processing system 24). The user interface may comprise a keyboard, a key, a switch or a logic circuit that is activated by the reader 18 reading the container 10 or tag 12 on the container 10. The user may enter ancillary data 20 such as a custodian identifier of the custodian in possession of the container 10, a location of the container 10, a time of scanning or reading the tag 12, a date of scanning or reading the tag 12 or other information. Other information may include product characteristic data, such as crop data, crop attribute data, harvesting data, agricultural production information, transport data, storage data, and temporal data. The date of scanning or reading the tag 12 may include a month, date, and year.

Under a second technique, the data generator generates the ancillary data 20 rather than requiring the user to enter data manually into a keyboard or another user interface. The generator may generate ancillary data 20 including one or more of the following: a custodian identifier of the custodian in possession of the container 10, a location of the container 10, a time of scanning or reading the tag 12, a date of scanning or reading the tag 12, product characteristic data (e.g., crop attribute data), harvesting data, transport data, storage data, and temporal data. The temporal data may include a time stamp, a date stamp, or both, for example The automatic generation or entry of the data or lack of manual entry may provide for more accurate information as the ancillary data 20 that is less susceptible to clerical or typographical errors from a human operator or unskilled laborer. When the container identifier 22 is read, the data generator may also generate a status, such as in-transit or at a particular location based upon an input from a global positioning device, a location-determining receiver, data storage or otherwise. In some cases, the reader 18 and data generator will be dedicated to a particular custodian identifier, a particular location or both so the particular custodian identifier and particular location are stored into the data storage prior to reading and retrieval from the data storage during or after reading. Accordingly, the global positioning device or receiver can be eliminated as an input where the location of the reader is generally fixed.

The data processing system transmits (e.g., 24, 32) the ancillary data 20 and the container data (e.g., container identifier 22) via a communications network 28 (e.g., the internet) to a data management system 30. In one embodiment, the ancillary data 20 and the containment data may be arranged together as composite data 26 (e.g., bundled data) for a transmission to the data management system 30 and storage in the data management system 30. Composite data 26 refers to data that has one or more associated components, such as ancillary data 20 and a container identifier 22.

The data management system 30 may comprise a distributed database system, a centralized database management system or another data storage system. The distributed data management system may involve a communicating group (e.g., a network) of computers that cooperate to store and retrieve particular components of an entire database or particular records of an entire database. In one illustrative embodiment, a master computer or main server may query secondary or child servers for information. Multiple servers or computers may service a request in a cooperative manner under the direction of the master computer or main server.

A centralized database may use one or more servers or data processing systems to store a database. The data storage of the data management system 30 may contain ancillary data 20 and container data (e.g., a container identifier 22). The ancillary data 20 may include temporal data that defines the container data, other ancillary data, or both. The temporal data component may include one or more of the following: a respective reading time or date for ancillary data 20, an input time or date for the ancillary data 20 or a respective reading time or date for container data. The data acquisition system 14 or a component thereof (e.g., a reader 18 or data input device 16) may have a clock or a time stamp module for providing temporal data based upon a reading time. The temporal data may be transmitted as composite data 26 by the first data processing system 24.

The data management system 30 can track container identifiers as containers are transported between different geographic sites or locations associated with different data acquisition systems 14. For example, where a data acquisition system 14 and a first data processing system 24 is associated with a first site and another data acquisition system 14 and nth data processing system 32 is associated with an nth site, the agricultural product associated with the same or equivalent container identifier may be used to create a chain of custody or product flow map for the agricultural product that tracks its flow between the first site and the nth site. In one embodiment, the chain of custody includes container identifier, product identifier, one or more custodian identifiers, one or more site identifiers, and corresponding time stamps. The chain of custody data may comprise container identifiers 22 and ancillary data provided at each site by the data acquisition systems 14. Further, the chain of custody data or product-flow description may be constructed from, or composed of, composite data 26. A user or subscriber to a data service may access the data management system 30 via a user terminal 601 or otherwise to verify the identity of the contents or chain of custody of a container associated with the user.

Figure 2:
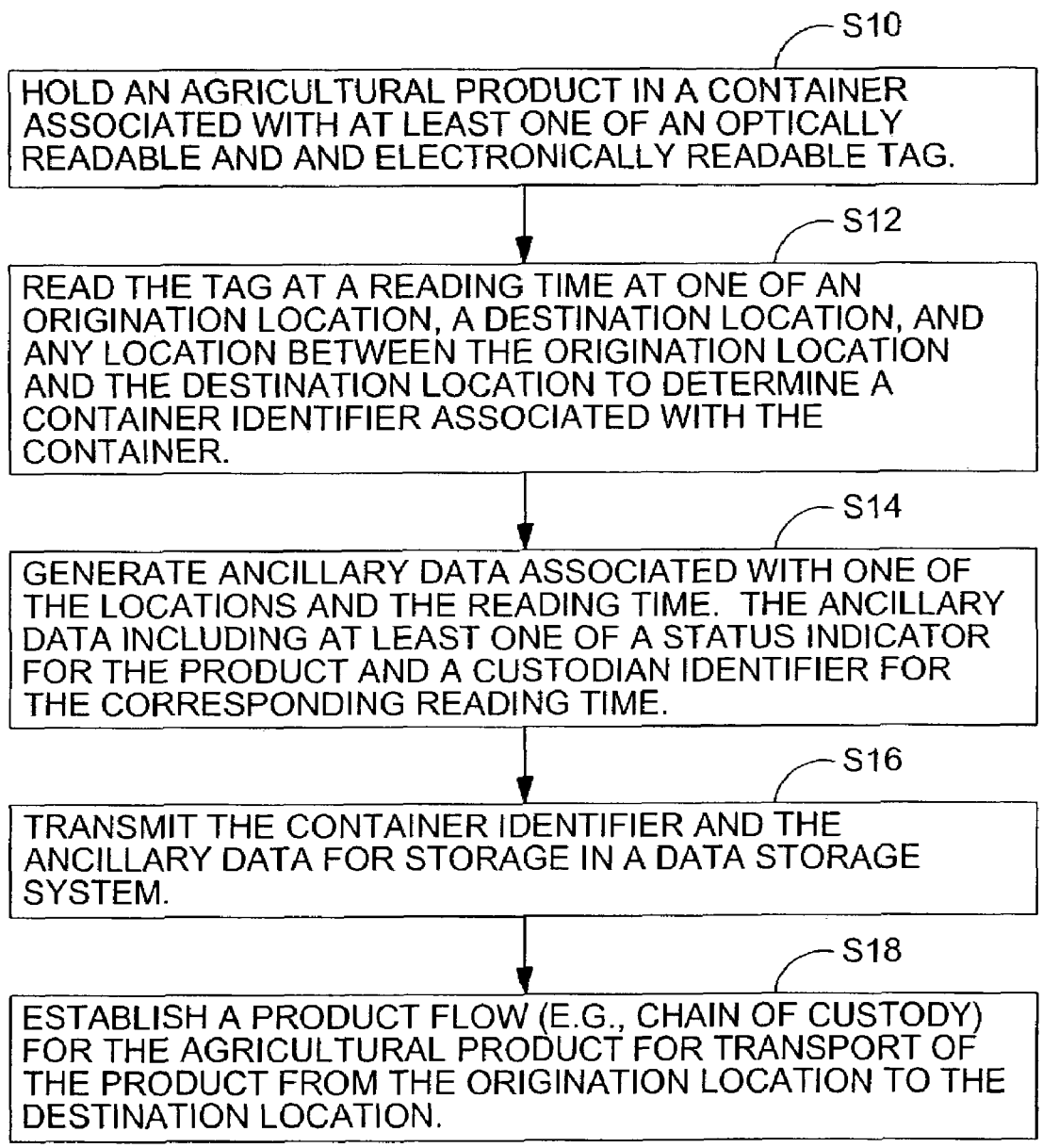
FIG. 2 is a flow chart of a method for tracing the identity of an agricultural product.

FIG. 2 shows a flow chart of a method for tracing the identity of an agricultural product in accordance with the invention. The method of FIG. 2 starts in step S10.

In step S10, a first party or another party holds an agricultural product in a container 10 associated with a tag 12 (e.g., an optically-readable tag, a radio frequency tag or an electronically-readable tag 12). The tag 12 is readable via electromagnetic radiation, which includes optical wavelengths, radio frequency wavelengths, infra-red wavelengths, and magnetism. The container 10 may comprise an inter-modal shipping container 10 that is suitable for transporting an agricultural product. The container 10 has a container volume, a container weight, container dimensions, volumetric capacity, and other specifications. The tag 12 may be attached to the container 10. For example, an optically-readable tag may be attached to an outside of the container 10 in a standard location or in another accessible location. The optically-readable tag may comprise a bar code or a universal product code (UPC), for example. An electronically-readable tag may comprise a radio frequency (RF) tag, for example.

In step S12, a reader 18 reads the tag 12 at a reading time. The reader 18 may be located at an origination location, a destination location or an intermediate location between the origination location and the destination location. The reader 18 reads the tag 12 to determine a container identifier 22 associated with the container 10. The tag 12 may be associated with data storage for storing container data, such as physical container specifications. The data storage may comprise electronic memory, Flash Memory, Electronically Erasable Programmable Read Only Memory (EEPROM), or any suitable electronic, optical or magnetic storage device. The reader 18 may provide the read container identifier or other read container data to the first data processing system 24. In one embodiment, the container data may be used to estimate or determine a maximum quantity or weight of the agricultural product in the container 10, a minimum quantity or weight of the agricultural product in the container 16, an average quantity or weight of the agricultural product in the container 10, or another statistical measure of the quantity or weight of the agricultural product in the container.

In step S14, the data input device 16 supports the input of additional or ancillary data 20 associated with one of the locations and the respective reading time. The ancillary data 20 includes one or more of the following: a status indicator, a location identifier, a custodian identifier, a transaction identifier, a temporal descriptor associated with the status, location, custodian or transaction, an origination location, an origination time, an origination date, an origination custodian, an intermediate location, an intermediate time, an intermediate date, an intermediate custodian, a destination location, a destination time, a destination date, and a destination custodian. The temporal descriptor may comprise a time of day, day, month, and year.

The custodian identifier may be assigned to a corresponding status or status indicator for a period of time so that it is unnecessary for the data generator to generate both a status indicator and a custodian identifier. Conversely, the status identifier may be associated with a particular custodian identifier for a defined period of time such that it may be unnecessary for the input device 16 to generate both a status indicator and a custodian identifier. The assignment of a status identifier to a corresponding custodian may be established in a user profile of a custodian; such a user profile may be stored in the data acquisition system 14 or the data processing system 24.

The ancillary data 20 may contain temporal data. The temporal data may represent a date and a time of the reading time when the reader 18 read the electronic tag 12. The custodian identifier may represent the identity of a custodian (a) who is or was in possession, (b) who is or was receiving possession, or (c) who is or was transferring possession of the container 10 at the time of reading the container 10. The status indicator associated with the custodian identifier may facilitate distinguishing the identity of the custodian who is in possession of the container from the identity of the custodian who is receiving possession of the container or transferring possession of the container, for example.

In step S16, the data processing system (e.g., first data processing system 24 through the nth data processing system 32) transmits the container identifier 22 and the ancillary data 20 for storage in a data management system 30. The container identifier 22 and the ancillary data 20 may be transmitted via a communications network 28 to a data management system 30.

In step S18, the data management system 30 or the data processing system (24, 32) establishes a report or provides reportable data on product-flow description (e.g., a chain of custody) for the agricultural product. The product-flow description may be established in accordance with several techniques, which may be used individually or collectively, in any combination.

Under a first technique for executing step S18, the product-flow description comprises a chain of custody for the agricultural product, or a derivative thereof. In general, the chain of custody represents a chain of possession of one or more custodians who possess the agricultural product or a derivative of the container 10 from (1) the origination location to the destination location, or (2) from the origination location to any intermediate location between the destination location and the intermediate location, or (3) from the intermediate location to the destination location, or (4) from the origination location to the destination location via one or more intermediate locations. As used herein, a custodian refers to a person or business entity that possesses, controls, or did possess or control the agricultural product or a derivative thereof. The chain of custody may be defined by a sequential list of custodians (e.g., an origination custodian, the intermediate custodian, and the destination custodian). For example, a chain of custody may include an origination custodian and an associated origination date, and an origination time during which the origination custodian had possession of the container 10 and the agricultural product. The chain of custody may also include an intermediate custodian associated with the possession of the container 10 at an intermediate time and an intermediate date. Further, the chain of custody may include a destination custodian associated with possession of the container 10 at a destination time and a destination date. The custodian identifiers may be associated with one or more locations of where the container 10 and the agricultural product were located at the time when the corresponding custodian had possession or custody of the agricultural product. The chain of custody may be determined based upon the container identifier 22 and the corresponding ancillary data 20 for sequential reading times.

In addition to a sequence of custodians and corresponding temporal data (e.g., time and date of possession stamps), the chain of custody may track activities that the container or its contents experience. For example, the activities may include loading of the agricultural product into the container 10, transport of the container 10, storage of the container 10, unloading of the agricultural product from the container, processing (e.g., refrigeration, heating, washing, cleaning) of the container 10, and processing (e.g., vacuum sealing, drying, heating or refrigeration) the contents within the container 10.

Under a second technique for executing step S18, the product-flow description comprises a historical travel path of the agricultural product or a derivative thereof. The historical travel path of the container and the agricultural products that it holds may be tracked. The travel path may include an origination location, one or more intermediate locations, and a destination location. Further, the travel path may include a time and a corresponding date of arrival, departure, or both, for each location. The travel path may include planned intermediate locations and planned destination locations that the container and its contents have not yet reached. The travel path may extend from a grower or harvester to the consumer. A user may reroute, redirect or revise the travel path of the container to meet a delivery requirement or to fulfill a contract on a timely basis or some other reason, for example.

Under a third technique for executing step S18, the product-flow description maintains historical records of previous historical travel paths of the container in addition to a present historical path of the container. For example, one load of an agricultural product will be removed from the container 10 and the container 10 will be re-used for another load of the same type (e.g., substantially similar or the same genetic composition) of agricultural product or a different type of agricultural product. A respective agricultural product (e.g., a respective product identifier) is assigned to a container identifier 22 for a limited period, duration of time or a defined time span during which the container holds or contains the agricultural product. The container may be emptied, cleaned, and reassigned to another agricultural product for a subsequent limited period or duration of time. The historical assignments of agricultural products, corresponding container identifiers, and corresponding dates and times are stored even after the agricultural product is removed or unloaded from the container. Accordingly, if the present load of a first container is contaminated by another agricultural product, the previous historical travel path of the first container may be retrieved to identify the source of the contamination as a prior load in the first container or a product that was at the same location and time in another container (e.g., a second container) outside of the first container.

The product-flow description or the chain of custody establishes the validity duration for the assignment of a container identifier 22 to an agricultural product. An electronically-readable tag 12 may be re-set after each use to a different container identifier. Alternately, the tag may go through a cycle of different container identifiers to facilitate differentiating the different agricultural products. Likewise, the optically-readable tag may be changed after each use of the container 10 for an agricultural product to avoid confusion. However, if the optically-readable or electronically readable tag is not updated with respect to the container identifier 22, the validity duration of the association of the container identifier 22 with the product may be gleaned from the duration between the origination date and the destination date. Further, the time period may be determined with reference to an origination time on the origination date and the destination time on the destination date.

Under a fourth technique for execution of step S18, the product-flow description comprises records of each handling transaction or exchange of custody as an agricultural product, or a derivative thereof, is moved in commerce. As the agricultural product is taken from the harvester to the processor, each handling transaction or exchange of custody of the product is tracked. The tracking is conducted on a cumulative basis so that the stored information includes historic handling information and current handling information. Handling information may comprise a handler identifier (e.g., a custodian identifier), a handling date, a handling time, and a handling location. A product-flow description (e.g., a product flow map) may be represented as a map of the handling that an agricultural product receives from a harvesting time until a consumption time.

Under a fifth technique for executing step S10, the product-flow description comprises one or more product flow maps between or among different supply chain members or between an origination site (e.g., harvesting site) and a destination site (e.g., retailer site or consumer site). The product flow map may be represented in textual, graphical, tabular or another format.

The product flow map may be generated (a) for each leg of a supply chain between different supply chain members or (b) on a geographic point-to-point basis between supply chain members. For instance, at the same time or after the product is placed in a storage destination (e.g., a primary storage destination), a first product flow map is generated from the harvesting site or origination site to the storage destination. A second product flow map may be generated from the storage destination to the processor site. A third product flow map may be generated from the processor and to a distributor, wholesaler, retailer, consumer or another party. The first product flow map, the second product flow map, the third product flow map or another product flow map facilitates tracking the product and derivatives thereof to assist in verification of the integrity of the delivered product and derivatives thereof.

In one embodiment, the product flow map may include an agricultural product that is traced through its transformation into a derivative product and its corresponding attributes. Accordingly, a product flow map may include a product identifier, a first derivative product identifier through an nth derivative product identifier, where n is any whole number equal to or greater than two. The product flow map further includes product attributes for each corresponding derivative product and identifier. For example, the agricultural product of corn may be transformed into the derivative product of corn flour, and further transformed into a baked good or another derivative product for human consumption. Another illustrative transformation would be the production of a pharmaceutical compound or derivative product from the agricultural product of genetically engineered corn that has been modified to produce certain proteins, antibodies, pharmaceutical precursors, chemicals or other components of medicinal treatment.

After the method of FIG. 2 is carried out, a user or a subscriber to the data management system may query the data management system for chain of title information. The user may be a purchaser or a potential purchaser of the agricultural product or a derivative thereof. The subscriber may determine the genuineness of the data.

Figure 3B:
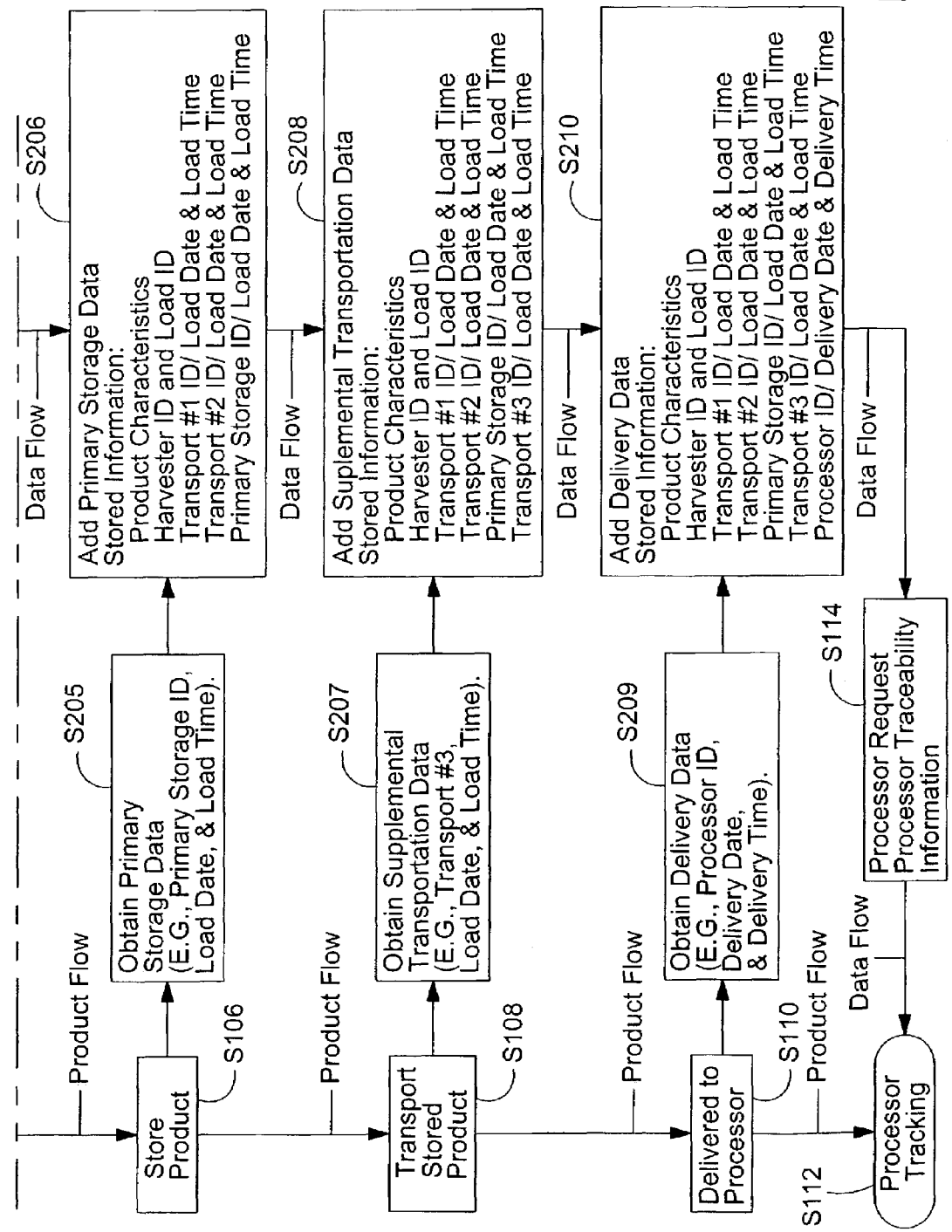
FIG. 3 is a flow chart of product information tracked from a harvesting time to a processing time.

FIG. 3 is a block diagram of a flow chart for product information tracked from a harvesting time to a processing time. The grower typically has possession of the product at the harvesting time, whereas the processor typically has possession of the product at the processing time. The method of FIG. 3 illustrates the flow of the product through a supply-chain and a corresponding flow of information which is associated with different transactions between supply-chain members. A supply chain member is any person or entity that holds title, possession or an economic interest in the agricultural product or a derivative thereof. For example, supply chain members may include, but need not include, a grower, a distributor, a wholesaler, a retailer, a shipper, a storer, and a processor. As illustrated in FIG. 3, the supply chain members include one or more of the following: a grower that harvests the product, a first transport member that transports the product, a second transport member that transports the product, a storage member that stores the product, a third transport member that transports the stored product, and a processor that processes the transported product.

In any of steps S102, S104, S106, S108, and S110 of FIG. 3, a member associated with the supply chain may scan the container 10 in which the harvested product is contained. As the tag 12 is scanned or afterwards, supplemental information is affiliated with the tag 12 for storage in the data storage (e.g., the data management system 30). The supplemental information may be originate from user input from a member of the supply chain into the data input device 16 (e.g., user interface or the data generator). In the case of the user interface, the member of the supply chain is able to enter into custom information or other information for tracking or tracing the flow of the product from the grower to the processor. In the case of the data generator, a user may activate the generator by reading the tag 12. Accordingly, the data generator may generate a pre-defined or pre-programmed data entry for association with the tag 12 identifier scanned from reading a container 10 that contains the product.

The method of FIG. 3 begins with the harvesting of the product in step S100. In step S199, before, during or after harvesting of an agricultural product, product characteristics or agricultural production information (e.g., harvesting data) is gathered or otherwise obtained for storage. The harvesting data may comprise one or more of the following: a harvesting time, a harvesting date, crop attribute, product attributes, moisture content, yield, harvested weight, harvester data, and load identifier. A producer has the opportunity to monitor the quality of an agricultural product during the harvesting process or otherwise.

In one embodiment, the product characteristics may represent crop attributes, specifications or properties that are sensed by sensors associated with or incorporated into a harvesting machine or combine. The sensors of the harvesting machine may create harvesting data that is associated with a load identifier, a date, a time, and a product identifier. The product characteristics may include the moisture level of the crop, the weight of the crop, the oil content of the crop, the nutritional value of the crop or other information.

In an alternate embodiment, a grower may enter product characteristics into a user interface associated with a data processing system (e.g., the first data processing system 24). The grower or another user may enter product characteristics into the user interface to complement machine-generated product characteristics, to alter machine-generated product characteristics or otherwise.

In step S200, the obtained harvesting data is stored in the data storage of a data management system 30 or in the data storage of an upstream component (e.g., data acquisition system 14 or data processing system (24, 32) that feeds or otherwise communicates information to the data management system 30). The information stored in the data storage may be affiliated with a tag identifier (e.g., a container identifier) associated with a container 10 in which the product is stored or placed.

In step S102, the first transporter receives the container 10 from the grower, or an agent thereof, after the product was harvested during step S100. Step S201 may occur simultaneously with or after reception of the container 10 in step S102. In step S201, the first transport identifier, the load date and time are entered into a user interface of a data input device 16 by a user, gathered automatically by a data input device 16, generated by a data generator or otherwise obtained by a data input device 16. For example, the first transport identifier is entered by a first transporter into a keyboard of a user interface of the data input device 16, whereas the time and date are generated by a clock or timer of the data input device 16. The data input device 16 may comprise a reader, an optical scanner, a data generator, a keypad, a keyboard, a switch or any other device for inputting data. In step S202, the first transporter adds the first transport identifier, the load date, and load time to the stored information associated with the received container 10 in the data storage of the data management system 30 or elsewhere.

In step S104, the second transporter receives the container 10 from the first transporter or an agent thereof. Step S203 may occur simultaneously with or after the reception of the container 10 in step S104. In step S203, the second transport member identifier, the load date, and load time are entered into a user interface of a data input device 16 by a user, gathered automatically by a data input device 16, generated by a data generator or otherwise obtained by a data input device 16. In step S204, the second transporter adds the second transport member identifier, the load date, and the load time to the stored information in the data storage of the data management system 30 or in an upstream network therefrom.

In step S106, the storage member receives the stored product from the second transporter or another transporter. Step S205 may occur simultaneously with or after the reception of the container 10 in step S106. Instep S205, the primary storage identifier, the load date, and load time are entered into a user interface of a data input device 16 by a user, gathered automatically by a data input device 16, generated by a data generator or otherwise obtained by a data input device 16. In step S206, the storage member adds the primary storage identifier, the load date, and the load time to the stored information for storage by the data management system 30 or otherwise.

In step S108, the third transporter receives the container 10 from the storage member. Step S207 may occur simultaneous with or after the reception of the container in step S108. In step S207, the third transport member identifier, the load date and time are entered into a user interface of a data input device 16 by a user, gathered automatically by a data input device 16, generated by a data generator or otherwise obtained by a data input device 16. In step S208, the third transport member adds the third transport member identifier, the delivery date, and the delivery time to the stored information for storage by the data management system 30 or otherwise.

In step S110, the processor receives the container 10 from the third transporter or another transporter. Step S209 may occur simultaneously with or after the reception of the container in step S110. In step S209, the processor identifier, the load date, and load time are entered into a user interface of a data input device 16 by a user, gathered automatically by a data input device 16, generated by a data generator or otherwise obtained by a data input device 16. In step S210, the processor adds the processor identifier, delivery date, and delivery time to the stored information for storage in the data management system 30 or elsewhere.

In step S114, the processor requests any of the stored information to verify one or more of the following: a product-flow description of a product or a derivative thereof, product traceability of a product or a derivative thereof, the identity or genuiness of a genetic composition of a product or a derivative thereof, the chain of custody of the product, and the chain of custody of the product or a derivative thereof from the grower to the processor. For example, the processor may have a subscriber data processing system 32, a user terminal 601 or a subscriber terminal 603 that accesses the stored information to confirm the chain of custody of a particular agricultural product or a derivative thereof with a particular tag 12 identifier of a container 10.

Figure 4B:
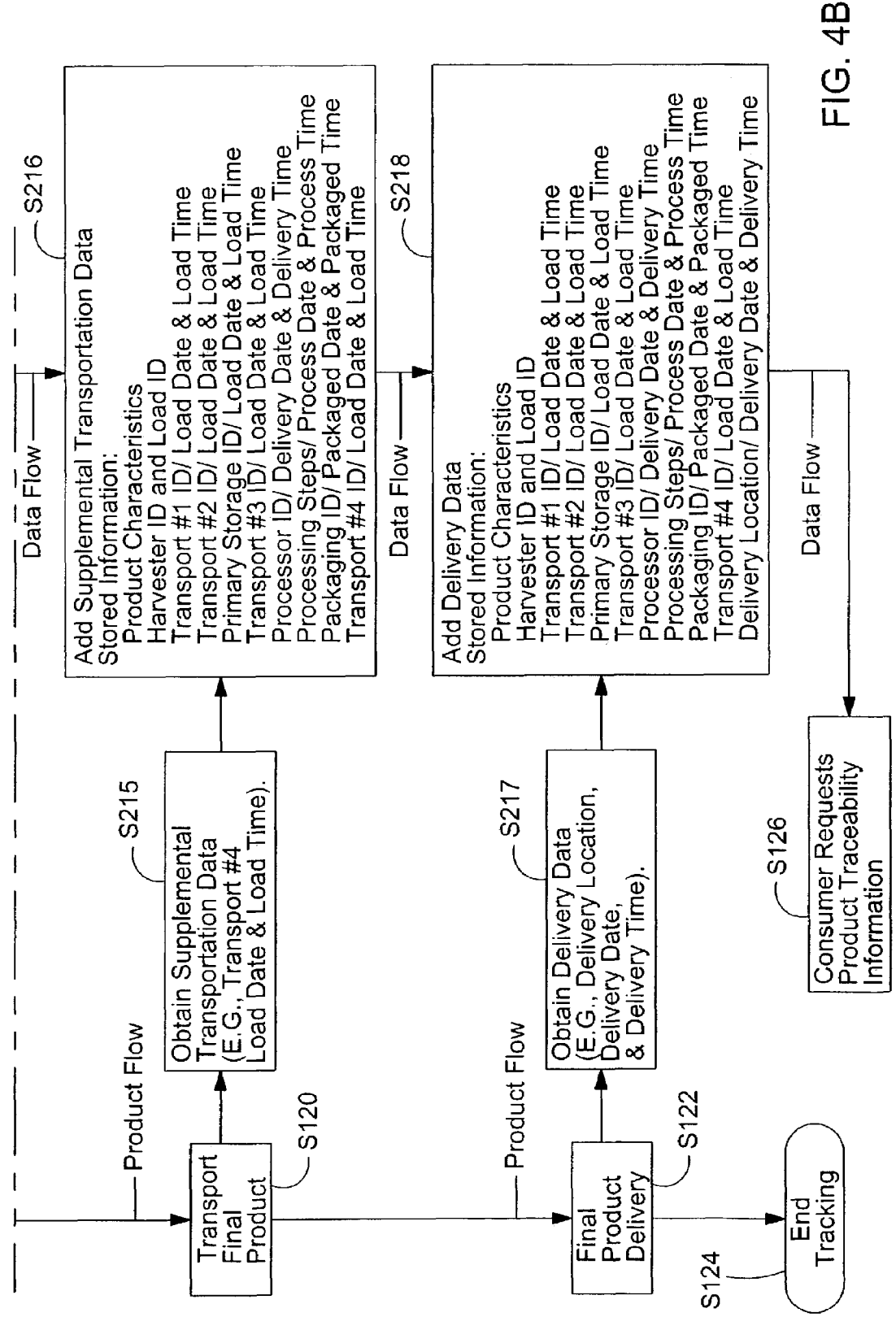
FIG. 4 is a flow chart of product information tracked from a processing time to a consumption time.

The method of FIG. 4 is similar to the method of FIG. 3, except the method of FIG. 4 tracks product information from a processing time to a consumer. The processing time is associated with a processor, whereas the consumption time is associated with a consumer. The method of FIG. 4 may follow, but does not need to follow, the method of FIG. 3. The method of FIG. 4 begins in step S116, which may follow product processing of step S112.

The product-flow description extends from the processor through to a consumer. The members of the supply chain of FIG. 4 include one or more of the following: a final processor, a packager, and a fourth transporter.

In step S116, the final processor receives the container 10 from the processor or another party. Step S211 may occur simultaneously with or after the reception of the container in step S116. In step S211, final processing data are entered into a user interface of a data input device 16 by a user, gathered automatically by a data input device 16, generated by a data generator or otherwise obtained by a data input device 16. In step S212, the final processor supplements the stored information by adding final processing data to the stored information for storage in the data management system 30 or elsewhere. The final processing data may include one or more of the following: processor identifier, final processor identifier, delivery date, delivery time, the delivery date to the processor, the delivery time to the processor, the delivery date from the processor, the delivery time from the processor, processing steps, processing identifiers, processing parameters, processing date, and processing time.

In step S118, the packing operation receives the container or the agricultural product within the container from the final processor. Step S213 may occur simultaneously with or after the reception of the container in step S118. In step S213, packaging data are entered into a user interface of a data input device 16 by a user, gathered automatically by a data input device 16, generated by a data generator, or otherwise obtained by a data input device 16. In step S214, the packing operation adds packaging data to the stored information. For example, the packing operation adds packaging data including a packaging identifier, a packaging date, and a packaging time.

In step S120, the fourth transporter receives the packaged product from the packer or packing operation. Step S215 may occur simultaneously with or after the reception of the container in step S120. In step S215, a fourth transport identifier, a load date, and a load time are entered into a user interface of a data input device 16 by a user, gathered automatically by a data input device 16, generated by a data generator or otherwise obtained by a data input device 16. In step S216, the fourth transporter supplements the stored information by adding a fourth transport identifier, a load date, and a load time to the stored information for storage in the data management system 30 or elsewhere.

In step S122, the distributor, wholesaler, retailer, consumer or another receiving member of the distribution chain receives the packaged product from the fourth transporter or an agent thereof. The receiving member (e.g., the consumer) is associated with a delivery location and a delivery date and time. Step S217 may occur simultaneously with or after the reception of the container in step S122. In step S217, delivery information, as further defined below, is entered into a user interface of a data input device 16 by a user, gathered automatically by a data input device 16, generated by a data generator or otherwise obtained by a data input device 16. In step S218, the receiving member of the distribution chain adds delivery data to the stored information. For example, the delivery information may include the delivery location, delivery time, and delivery date associated with the transfer or exchange of the transported product between the fourth transporter (or his agent) and the receiving member. If a delivery is received by or made by a retailer, the delivery information may further comprise a retailer identifier.

In step S126, the consumer or user may represent a subscriber to a data processing system 30 such that the consumer can request the product traceability data developed from the processor to the retailer. The user may access the data stored within, or associated with, the data processing system via at least one of the user terminal 601, subscriber data processing system 32, and the subscriber terminal 602. The consumer may use the product traceability information to verify the contents of a product or a derivative thereof. For example, the consumer may verify that the products do not contain allergens or other ingredients that may cause an unwanted side effect or physical reaction or medical reaction to the consumption of the product. In addition, the consumer may merely want to verify or confirm the source or contents of the product so that the consumer may purchase or obtain product that is consistent with the consumer's preferences. For example, a consumer may have a preference for a particular variety of vegetable or an organically-grown vegetable or fruit. The stored information and information appended thereto in any of the steps of FIG. 3 and FIG. 4 is arranged in a standardized format.

Figure 5:
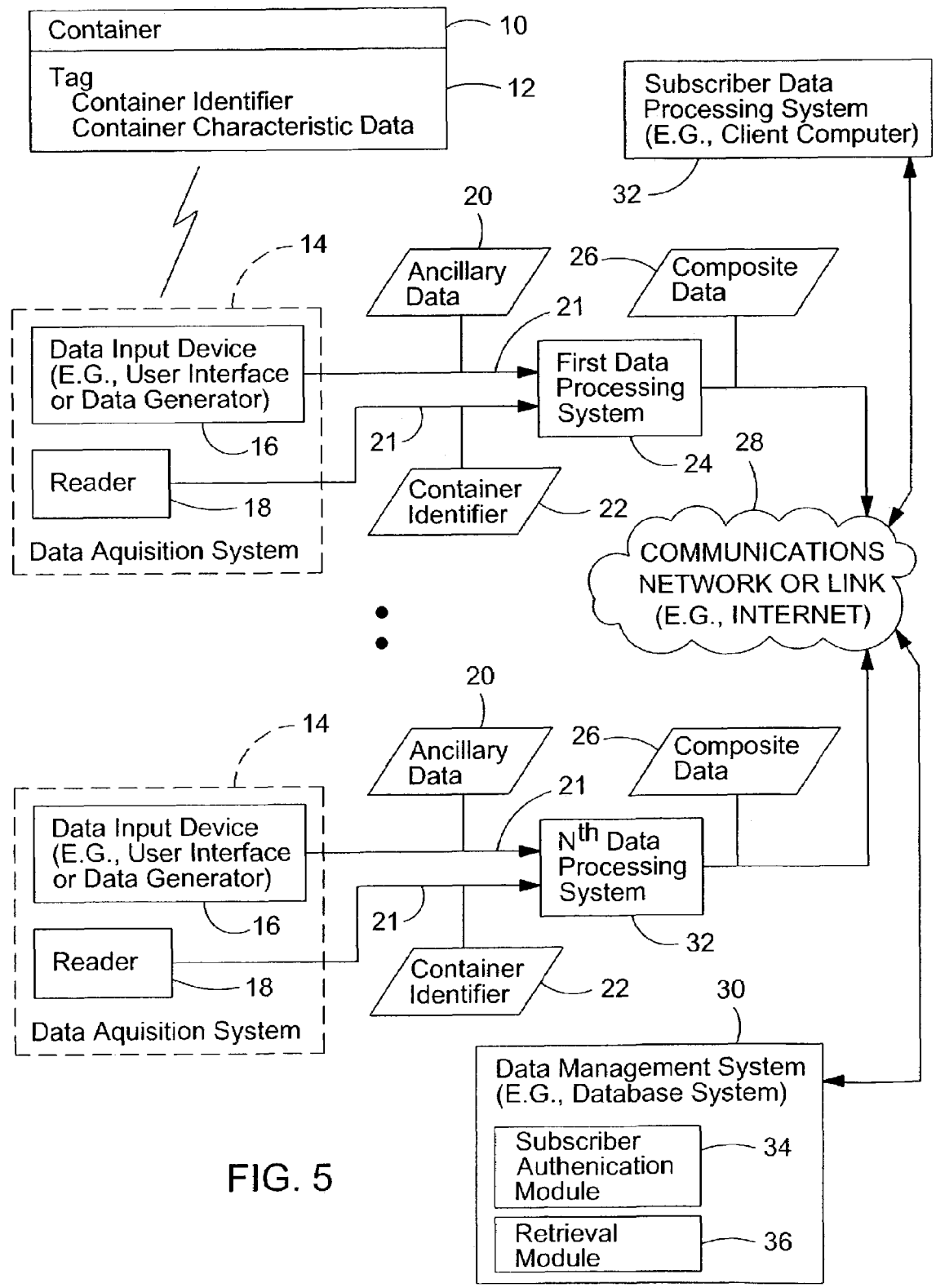
FIG. 5 is a block diagram of an alternate embodiment of a system for tracing the identity of an agricultural product.

FIG. 5 shows a block diagram of a system for tracing the identity of an agricultural product or a derivative thereof. The configuration of FIG. 5 is generally consistent with the configuration shown in FIG. 1, except the configuration of FIG. 5 includes subscriber data processing system 32, includes one or more subscriber modules (34, 36), and excludes user terminal 601.

FIG. 5 shows a subscriber data processing system 32 coupled to the communications network 28. The subscriber data processing system 32 facilitates the retrieval and querying of information from the data management system 30. The data management system 30 includes one or more subscriber modules (34, 36) to support the querying, data retrieval, and data requests associated with the subscriber data processing system 32. Like reference numbers in FIG. 1 and FIG. 5 indicate like elements.

In one embodiment, the data management system 30 may include a retrieval module 36 and a subscriber and authentication module 34. The subscriber authentication module 34 represents a security measure for authenticating the identity of a subscriber data processing system 32 and a subscriber or user of the data management system 30. The subscriber authentication module 34 may include at least one password (e.g., a login password) and a user identifier that may be entered prior to granting access to the contents of the data management system 30, the subscriber data processing system 32 or both.

The retrieval module 36 entails one or more computer programs or software instructions for retrieving one or more records or items of stored information managed by the data management system 30 in reply to a subscriber (e.g., consumer) request. For example, a product-flow description or a product flow map, which the subscriber may request could include a request for one or more of the following: product traceability information, processing history, possession history, product content, chain-of-custody data, and stored information related to supply management, logistics, transportation, storage, exporting or importing the agricultural product or a derivative thereof.

Figure 6:
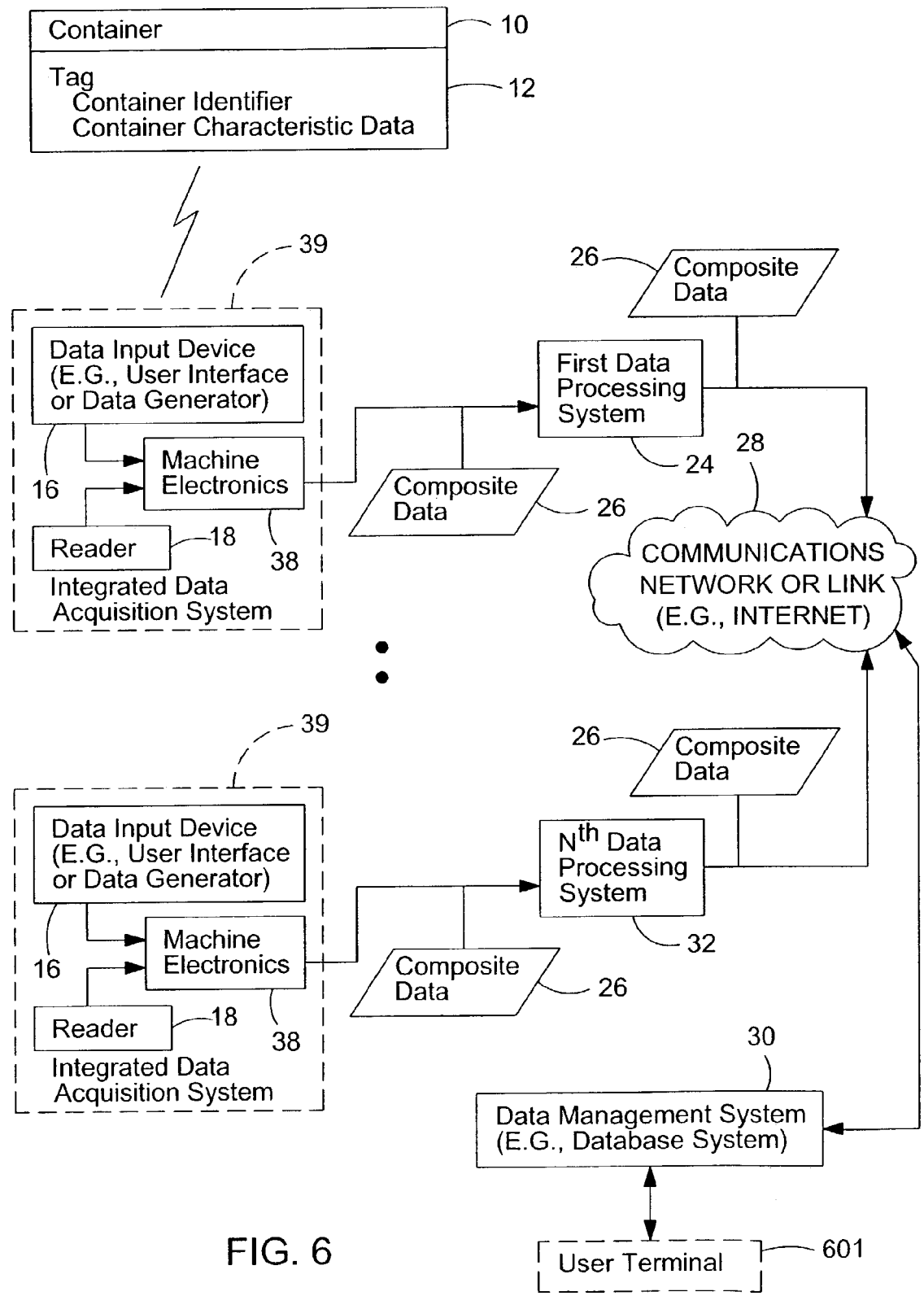
FIG. 6 is another alternate embodiment for a system for tracing the identity of an agricultural product that includes machine electronics associated with an agricultural machine.

FIG. 6 shows a block diagram of a system for tracing the identity of an agricultural product. The configuration of FIG. 6 is similar to the configuration of FIG. 1, except the configuration of FIG. 6 includes an integrated data acquisition system 39 rather than data acquisition system 14. Like reference numbers in FIG. 1 and FIG. 6 indicate like elements.

The integrated data acquisition system 39 comprises a data input device 16 and a reader 18 coupled to machine electronics 38. The reader 18 communicates a container identifier 22 to the machine electronics 38. The data input device 16 may supplement the container identifier 22 with ancillary data. Further, the machine electronics 38 may include a sensor, a monitor, a detector or some other data source for providing supplemental data or ancillary data to the data processing system (e.g., 24 or 32). In one embodiment, the machine electronics 38 comprises a Communications Area Network (CAN) databus that supports the collection of data on an agricultural product or derivative thereof or that supports the transfer of data to a supply chain member or another user.

In one embodiment, the machine electronics 38 represents electrical or electronic circuitry associated with a machine, such as an agricultural machine, a tractor, a harvester, a combine, transportation equipment, a truck or a vehicle. The machine electronics 38 of a machine (e.g., agricultural machine) may be coupled to a data processing system (e.g., a first data processing system 24). For example, the machine electronics 38 of a machine may be coupled to a data processing system via cables, transmission line or wireless equipment (e.g., transceivers).

The machine electronics 38 may communicate information about the agricultural product, such as product characteristic data, harvest data, transport data, storage data, temporal data, components or other ancillary data 20. For example, the machine electronics 38 may communicate one or more of the following to the data processing system: ancillary data, supplemental data, container data, and composite data. The composite data may comprise any two of ancillary data, supplemental data, and container data (e.g., the container identifier 22).

The machine electronics 38 communicates the composite data to the first data processing system 24. In turn, the first data processing system 24 may communicate to a data management system 30, via a communications network 28 or a communications link.

FIG. 7 illustrates that a variation of the configuration of FIG. 1 FIG. 7 is similar to FIG. 1, except the configuration of FIG. 7 includes a portable data acquisition system 40, instead of a data acquisition system 14. Further, FIG. 7 includes wireless units 42 to facilitate communications between a portable data acquisition system 40 and a wireless unit 42 that is associated with a data processing system (e.g., 24, 32). Like reference numbers in FIG. 1 and FIG. 7 indicate like elements.

The portable data acquisition system 40 comprises a data input device 16 and a reader 18 that are coupled to a wireless unit 42. In practice, the data input device 16, the reader 18, and the wireless unit 42 may be packaged into a hand-held device. The wireless unit 42 of the portable data acquisition system 40 may communicate with the wireless unit 42 associated with the first data processing system 24. The wireless unit 42 may comprise a transmitter, a receiver or a transceiver. For example, the wireless unit 42 associated with the portable data acquisition system 40 may comprise a transmitter, whereas the wireless unit 42 associated with the receiver may comprise a receiver.

The machine electronics 38 are not present in FIG. 7, but could receive input data from the data input device and reader. Further, the machine electronics could output data (e.g., composite data) to the wireless unit 42 of the portable data acquisition system 40.

FIG. 8 is a flow chart of a procedure for collecting data on product characteristics. The procedure in flow chart of FIG. 8 may occur prior to step S10 of FIG. 2, for example.

In step S20, the agricultural product may be associated with harvesting data (e.g., product characteristic data, a harvester identifier or both). The product characteristic data may be gathered during or about a harvesting time for the agricultural product. The harvester identifier may represent the identity of a human worker who harvests the agricultural product or a mechanical harvester that harvests the agricultural product. The product characteristic data, the harvester identifier, or both, may be collected automatically or entered manually by a user. For automatic collection, the machine electronics of an agricultural machine (e.g., a harvester or combine) or a sensor may be used to gather the product characteristic data. For manual collection, a user may make entries of product characteristic data and harvester identifier into a computer or another data processing device via a keyboard or another user interface. The gathered harvesting data may be stored for transmission to a data management system 30 or transmitted to a data management system 30.

Figure 9:
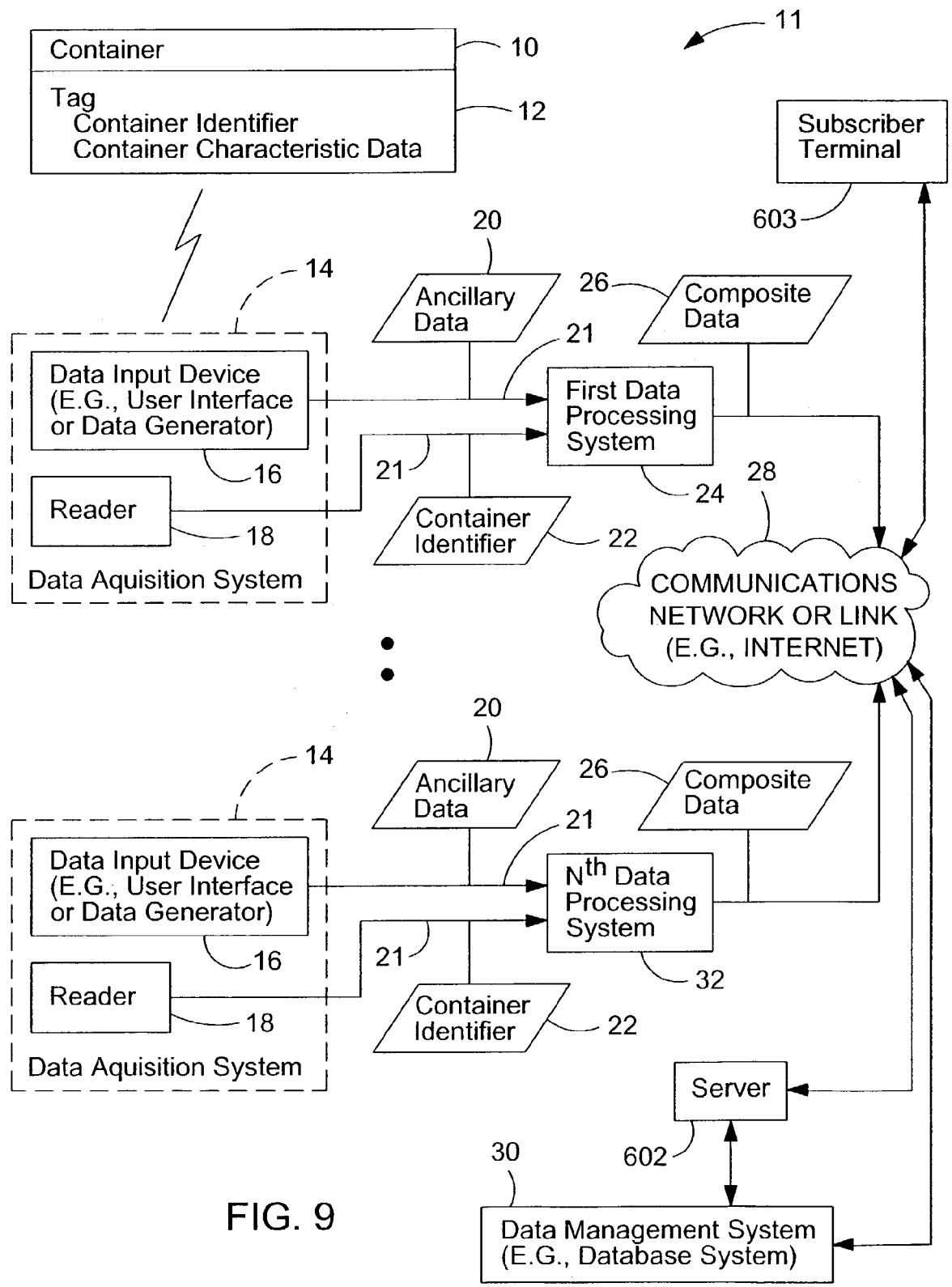
FIG. 9 is a block diagram of yet another alternate embodiment of a system for tracing the identity of an agricultural product.

FIG. 9 is a block diagram of an alternate embodiment of a system for tracing the identity of an agricultural product or a derivative thereof. The configuration of FIG. 9 is similar to the configuration of FIG. 1, except the configuration of FIG. 9 includes a subscriber terminal 603, includes a server 602, and excludes the user terminal 601. The server 602 may support requests for stored information, data storage and retrieval operations. The subscriber terminal 603 may represent a client with respect to the server 602.

Figure 10:
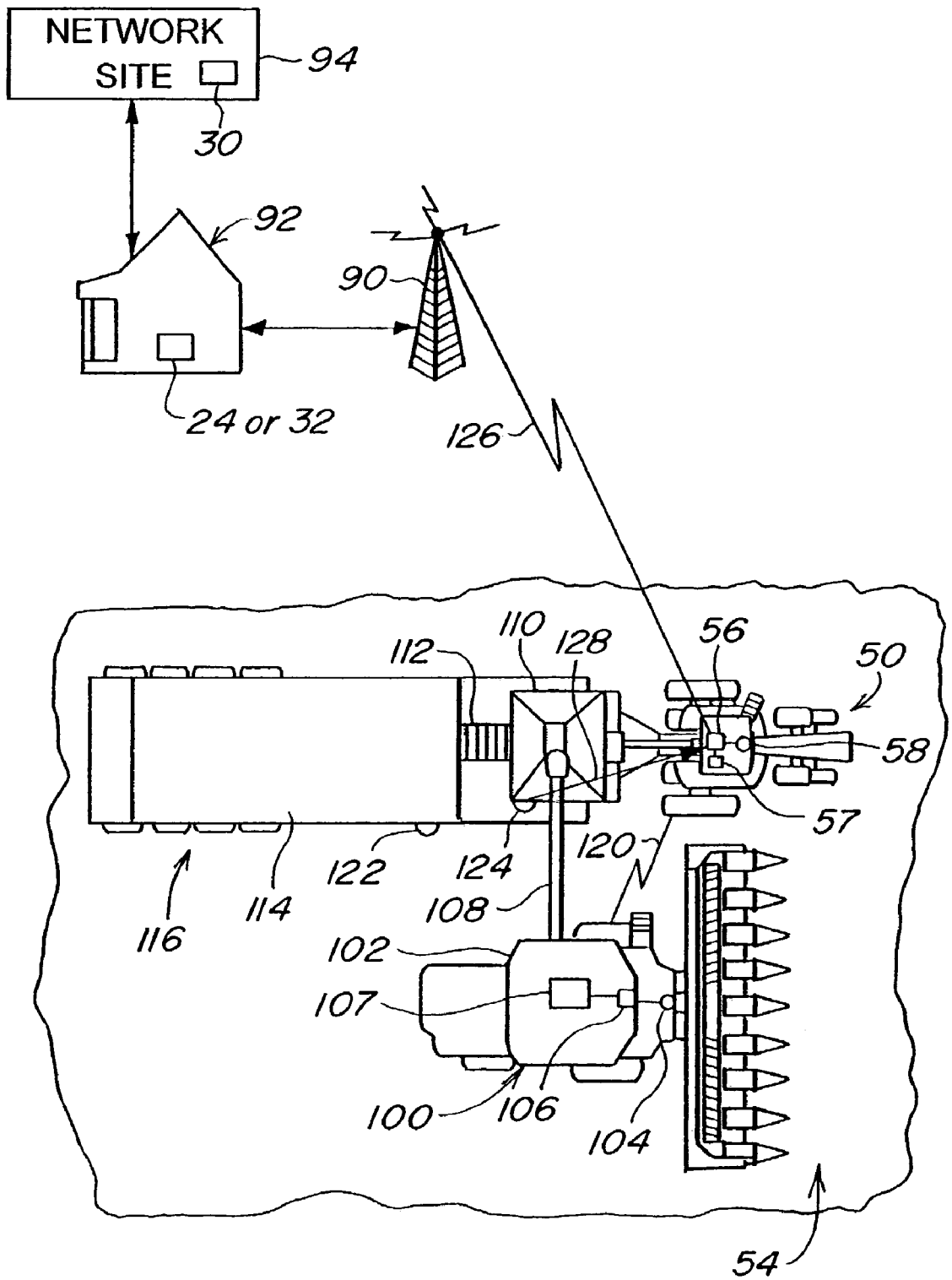
FIG. 10 is a schematic illustration of information collection during a harvesting operation.

As shown in FIG. 10, the grain is unloaded from a combine 100 to a hopper 110. The grain tank 102 of the combine 100 is emptied via an unloading auger 108, a conveyer belt or via another conveyance system. From the hopper 110, a conveyor 112 transfers the crop to a freight container 114. The freight container 114 is an illustrative embodiment of the container 10. The hopper 110 and conveyor 112 are part of a container cart 116 used to transport the container 114 through the field 54. The tractor 50 tows the container cart. Exemplary container carts are shown in U.S. patent application Ser. No. 09/969,203 filed Oct. 1, 2001, assigned to the assignee of the present application and hereby incorporated by reference.

As the grain tank 102 is unloaded, the harvesting information stored in the combine computer 106 is transmitted wirelessly to the tractor computer 56 on the tractor 50, as shown by the arrow 120. The combine computer 106 and the tractor computer 56 may comprise machine electronics 38 of FIG. 6 or the integrated data acquisition system 39, for example.

The combine computer 106 is coupled to a first wireless communications device 107. The tractor computer 56 is coupled to a second wireless communications device 57. The first wireless communications device 107 may comprise a transmitter, a transceiver or the combination of a transmitter and receiver. Similarly, the second wireless communications device 57 may comprise the combination of a receiver, transceiver, or the combination of a transmitter and a receiver, for example. The first wireless communications device 107 and the second communications device 57 are capable of communicating with each other directly via an electromagnetic signal (e.g., radio frequency signal) or via a repeater or a wireless communications network.

Any type of suitable wireless data transfer method can be used to transfer agricultural production data on an agricultural product between the combine computer 106 and the tractor computer 56. Where multiple combines and tractors are operating in the same field, Global Positioning System (GPS) location information from both the combine and the tractor ensure that the tractor receives harvest information from the same combine from which the crop is received. The combine 100 and tractor 50 are associated with a corresponding combine location-determining receiver 58 (e.g., GPS receivers with differential correction) and a tractor location-determining receiver 104, respectively. In one example, a combine-tractor pair, which transfers an agricultural product between the paired combine and tractor during harvesting, is identified by determining the closest geographic coordinates of all of the active combines and tractors in a field or determining the closest tracking or most highly correlated geographic coordinates and/or directional vectors over a minimum threshold time period. The location-determining receivers (58,104) provide the geographic coordinates and vectors for determining the combine-tractor pair.

The tag on the container 114 may comprise a Radio Frequency (RF) tag 122, for example. The RF tag 122 contains an identifier of the container 114. A reader 18 may comprise a RF reader 124 on the container cart 116. The RF reader 124 queries the RF tag 122 and receives a response therefrom that includes the container identifier. The reader 124 is coupled to the tractor computer 56, either wirelessly or by wire, and transmits the container identifier as shown by the arrow 128. Accordingly, the reader 124 of the container cart 116 and the tractor computer 56 together, may represent a single integrated data system 39.

The agricultural production data (e.g., harvesting information) relating to the agricultural product deposited in the container 114, together with the container identifier, is transmitted wirelessly as shown by the signal 126 to the receiver 90. The receiver 90 may be associated with a data processing system (24, 32) at the remote farm office 92 or elsewhere. The data processing system (24, 32) at the remote farm office 92 may store and/or upload one or more of the following obtained data: the agricultural production data, container data, container identifier, initial data, ancillary data, and composite data. The data processing system (24, 32) may transmit the obtained data to a network site 94, such as the data management system 30 via a communications network 28.

At the data processing system (24, 32), the ancillary data or additional data may be added to a container identifier. For example, the harvesting information is combined with the planting and other production information based on the geo-reference location information. That is, the planting information for a given location is combined with the harvesting information for the same location. The combined planting information, harvesting information, and other agricultural production information and the container identifier form the composite data for the harvested agricultural product. The composite data may be associated with the container identifier for the container 114 as a reference or pointer to the remainder of the composite data for a particular agricultural product.

At the data processing system (24, 32), other production information, including chemical application and mechanical soil treatments, both prior to and after planting, may be collected to add to the composite data. Weather information during the growing season can be collected from the Internet or by other means, and added to the composite data at the farm office 92.

As shown and described with reference to FIG. 10, the harvesting information is transferred from the combine 100 to the tractor 50 pulling the container cart 116. Alternatively, the tractor computer 56 can be located on the container cart 116 or the combine computer 106 in conjunction with suitable wireless communications devices used to receive, store, and transfer information to the farm office 92.

FIG. 10 illustrates the harvesting operation with the crop being loaded into a freight container 114 from the combine 100. Another practice that may fall within the scope of the invention is to discharge the crop from the combine into a grain cart for transporting away from the field and depositing into a storage device.

The method and system of tracing an agricultural product can be used in such a harvesting operation as shown in FIG. 11. Like reference numbers in FIG. 10 and FIG. 11 indicate like elements. The agricultural production data (e.g., harvesting information) is transferred from the combine 100 to the tractor 50 pulling the grain cart 158 when the combine grain tank is unloaded. The line 160 shows the information transfer between the first wireless communications device 107 of the combine 100 and the second wireless communications device 57 of the tractor 50. Accordingly, the agricultural production data gathered by the combine computer 106 is transmitted to the tractor computer 57 for holding until the agricultural production data and any container identifier is conveyed to the data processing system (24, 32) or to another computer of another agricultural machine.

In the illustrative example of FIG. 12, when the grain cart 158 is unloaded or at another suitable time, the agricultural production information (e.g., harvesting information) may be transferred from the tractor computer 56 of tractor 50 to secondary tractor computer 156 of a tractor 162. Like reference numbers in FIG. 11, FIG. 12 and FIG. 13 indicate like elements. Tractor 162 is used to operate a container loader 164 that receives the crop from the grain cart 158 and loads the crop into a container 166. The container loader 164 is shown in more detail in U.S. patent application Ser. No. 09/970,235 filed Oct. 1, 2001, assigned to the assignee of the present application, and hereby incorporated by reference. The container 166 has an RF tag 168 with a container identifier. The RF reader 172 on the loader 164 queries the RF tag 168. When the crop is transferred from the grain cart 158 to the container 166, the identifier of the container is captured and transmitted to the secondary tractor computer 156, as shown by arrow 174 for association with the collective data profile 12. The harvesting information is then transferred to the farm office 92 in the same manner as previously described. Each time the crop is transferred from one vessel to another, the time and location is recorded to enable association of the data profile with the container identifier of the container that ultimately receives the crop. Further, if the agricultural product is transferred between multiple containers during harvesting, the historical container list of container identifiers may be available as part of the composite data.

Although FIG. 12 shows the transfer of agricultural production data via secondary tractor computer 156, it will be appreciated that alternatively, the container identifier could be transmitted to the computer 56 on tractor 50, and from there, the harvest information is transferred to the data processing system (28,32) at the farm office 92.

The composite data can be stored and maintained at the farm office 92. The producer can use the data profile for farm management to market the crop and/or to verify contract or certification compliance.

In a preferred embodiment of the invention, the composite data is stored and maintained by an information service provider that operates the network site 94. There, the data profile can be readily accessed through the network, such as the Internet, by the downstream processors and manufacturers. The processing and manufacturing information is easily added to the data profile 12 at the network site 94.

In any of the foregoing embodiments, a subscriber of the data management system 30 may pay a fee for accessing information about various containers, agricultural products associated with the containers or precursors of products. The subscriber may do a query based on a container identifier or other characteristics that are associated with the contents of the container at a particular time. The data management system 30 may store the data in a relational database or a table which includes one or more of the following fields: container identifiers, corresponding time stamps, container content data, and location data. In one embodiment, the data includes container identifiers and corresponding time stamps of the changes in contents of the container. The data may also include data on the location of the container that is associated with a time stamp so the user or subscriber can locate the container and route the container to meet business needs or other requirements on a real-time basis. If the chain of custody of the travel path of the ultimate product or a precursor of the ultimate product are known, the ultimate product may be associated with a higher product integrity and a lower contamination risk than would otherwise be possible. The harvested agricultural product may represent a precursor of the ultimate product, where the harvested agricultural product is processed, transformed or combined with other product inputs to produce the ultimate product. However, the harvested agricultural product may represent the ultimate product, where the harvested agricultural product is not processed or transformed.

The method and system supports the user's or subscriber's ability to use it as a tool to maintain and monitor the integrity of a product in relation to its handling processes. Traceability is provided across the product-use chain (e.g., the food chain) and the offering of a tool to document, research and remedy contamination of a commodity at each point in the product use or food chain. The system facilitates record-keeping of the handling of an agricultural product from the harvesting time to the consumption time or from the harvester to the consumer. The handling may be defined by a travel path of the agricultural product or a precursor thereto. If product handling processes are tracked, the processor or down-stream member of the supply chain may be able to rate the reliability of the handlers of the agricultural product to maintain adequate processes and control measures. Further, if all agricultural products are tracked for a handler at a given geographic location and time, cross-contamination of agricultural products at the handler are more readily identified.

Any agricultural product or crop referenced herein may be produced in one or more of the following locations: a field, an open field, an orchard, a groove, a forest, a hothouse, an indoor crop production facility or another suitable crop growing area without limitation. Planting in soil is also not required. The plants or seeds may be grown hydroponically, with or without a medium, to provide mechanical support of the plant.

For further aspects of the system and method described herein, refer to U.S. patent application Ser. No. 10/327,277, filed on Dec. 20, 2003 and U.S. Provisional Application No. 60/366,181, filed Mar. 20, 2002, which are incorporated herein by reference.

Having described one or more embodiments, it will become apparent that various modifications can be made without departing from the scope of the invention as defined in the accompanying claims.

The following is claimed:

1. A computer-implemented method for tracing the identity of an agricultural product, the method comprising:

holding an agricultural product in a container associated with a tag, the tag being readable via electromagnetic radiation;

reading the tag at a reading time at one of an origination location, a destination location, and any location between the origination location and the destination location to determine a container identifier associated with the container;

generating ancillary data associated with one of the locations and the reading time, the ancillary data including at least one of a status indicator for the product and a custodian identifier for the corresponding reading time;

transmitting the container identifier and the ancillary data for storage in a data management system;

establishing a product-flow description for the agricultural product for transport of the product from the origination location to the destination location based on the container identifier and the corresponding ancillary data for sequential reading times;

wherein the establishing comprises establishing a historical travel path of the container and the agricultural product or a derivative thereof, the travel path including at least one of an origination location, an intermediate location, and a destination location for the agricultural product or a derivative thereof; and wherein the product-flow description comprises an agricultural product traced through its transformation into a derivative product and its corresponding attributes, the product flow description including a first derivative product identifier through an nth derivative product identifier, where n is any whole number equal to or greater than two, product attributes for each corresponding derivative product, and a product identifier.

2. The method according to claim 1 wherein the product-flow description comprises a chain of custody of the agricultural product or a derivative thereof.

3. The method according to claim 1 wherein the chain of custody is defined by a sequential list of custodians including at least one of an origination custodian, an intermediate custodian, and a destination custodian.

4. The method according to claim 1 further comprising generating ancillary data including one or more of the following: an origination location, an origination time, an origination date, an origination custodian, an intermediate location, an intermediate time, an intermediate date, and an intermediate custodian, a destination location, a destination time, a destination date, and a destination custodian.

5. The method according to claim 1 wherein the ancillary data comprises one or more of the following: product characteristics data, product treatment data, product storage environmental data, harvesting equipment identifier, harvested load identifier, harvested load time, transport identifier, transport load date, transport load time, transport load date, transportation time, transportation duration, storage facility identifier, storage load time, storage load date, and a processor identifier, a processor delivery date, and a processor delivery time.

6. The method according to claim 1 further comprising: providing product characteristics corresponding to the product to a recipient of the product associated with the destination location.

7. The method according to claim 1 further comprising: storing a product identifier associated with the container identifier in the data management system; and storing the transmitted ancillary data in the data management system.

8. The method according to claim 1 further comprising: storing a product characteristic associated with the container identifier in the data management system; storing composite data arranged from the ancillary data and the container identifier in the data management system.

9. The method according to claim 1 wherein the generating ancillary data comprises generating harvesting data about the agricultural product during a harvesting of the agricultural product.

10. The method according to claim 1 wherein bundling of read tag data and generated ancillary data are accomplished by machine electronics mounted in an agricultural machine.

11. The method according to claim 1 further comprising: accessing the data management system to trace the identity of an agricultural product received at a destination location.

12. The method according to claim 1 wherein the establishing comprises maintaining historical records of previous historical travel paths of the container in addition to a present historical path of the container to determine a possible source of contamination of the agricultural product associated with the present historical path.

13. The method according to claim 1 wherein the establishing comprises establishing a validity duration for the assignment of a container identifier to a tag of the container for holding an agricultural product.

14. The method according to claim 1 wherein the establishing comprises resetting a container identifier associated with each tag after each use from the origination location to the destination location.

15. A system for tracing the identity of an agricultural product, the system comprising:
- a container for holding an agricultural product, the container associated with a tag, the tag being readable via electromagnetic radiation;
- a reader for reading the tag at a reading time at one of an origination location, a destination location, and any location between the origination location and the destination location to determine a container identifier associated with the container;
- a data input device for generating ancillary data associated with one of the locations and the reading time, the ancillary data including at least one of a status indicator for the product and a custodian identifier for the corresponding reading time;
- a first data processing system for transmitting the container identifier and the ancillary data for storage;
- a data management system for storing the transmitted container identifier and ancillary data, and for establishing a product-flow description for the agricultural product for transport of the product from the origination location to the destination location;
- wherein the combination of the reader and the data input device comprises a first acquisition system, the first acquisition system associated with the first data processing system, and wherein an Nth data acquisition system is associated with a Nth data processing system, where N is a whole number equal to or greater than two; and
- wherein the first acquisition system through the Nth data acquisition system are each associated with different geographic sites associated with a geographic travel path of the container, and wherein the first data processing system and the Nth data processing system send obtained ancillary data and container identifiers to the stored information associated with the data management system.

16. The system according to claim 15 wherein a user interface is coupled to the data management system, the user interface facilitating retrieval of at least a portion of the stored information on the product.

17. The system according to claim 15 wherein the data processing system communicates to the data management system via a communications network.

18. The system according to claim 15 wherein the data input device and the reader are coupled to a first wireless unit; the first data processing system is associated with the second wireless unit; and the second wireless unit is adapted for communications with the first wireless unit.

19. The system according to claim 15 further comprising machine electronics of an agricultural machine receiving input data from the reader and the data input device, the machine electronics transmitting output data to the first data processing system.

20. The system according to claim 15 further comprising: a communications network for facilitating communications between the first data processing system and the data management system; a subscriber data processing system in communication with the communications network for retrieving stored information from the data management system.

21. The system according to claim 20 further comprising:
- a communications network for facilitating communications between the first data processing system and the data management system;
- a subscriber terminal in communication with the communications network for retrieving stored information from the data management system;
- a server interposed between the data management system and the communications network for handling requests of the subscriber terminal.

* * * * *